(12) United States Patent
Matsumoto et al.

(10) Patent No.: US 11,605,362 B2
(45) Date of Patent: Mar. 14, 2023

(54) INFORMATION DISPLAY DEVICE AND INFORMATION DISPLAY METHOD

(71) Applicant: Panasonic Intellectual Property Management Co., Ltd., Osaka (JP)

(72) Inventors: Masaharu Matsumoto, Osaka (JP); Yoshifumi Asao, Hyogo (JP); Takeshi Hatakeyama, Osaka (JP); Tomonori Sugiyama, Osaka (JP); Hideaki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/237,623

(22) Filed: Apr. 22, 2021

(65) Prior Publication Data

US 2021/0241721 A1 Aug. 5, 2021

Related U.S. Application Data

(63) Continuation of application No. PCT/JP2019/018029, filed on Apr. 26, 2019.
(Continued)

(51) Int. Cl.
*G09G 5/00* (2006.01)
*G09G 5/10* (2006.01)
(Continued)

(52) U.S. Cl.
CPC ............... *G09G 5/10* (2013.01); *G06F 3/041* (2013.01); *G09G 5/02* (2013.01); *G09G 2320/0626* (2013.01); *G09G 2360/14* (2013.01)

(58) Field of Classification Search
CPC .... G09G 5/10; G09G 5/02; G09G 2320/0626; G09G 2360/14; G09G 2354/00;
(Continued)

(56) References Cited

U.S. PATENT DOCUMENTS

2009/0096937 A1* 4/2009 Bauer ................ B60R 1/12
348/739
2009/0231313 A1 9/2009 Teranishi et al.
(Continued)

FOREIGN PATENT DOCUMENTS

EP 2 461 318 6/2012
JP 2007-206577 8/2007
(Continued)

OTHER PUBLICATIONS

Communication pursuant to Rule 164(1) EPC dated Oct. 26, 2021 in European Patent Application No. 19875222.2.
(Continued)

*Primary Examiner* — Adam R. Giesy
(74) *Attorney, Agent, or Firm* — Wenderoth, Lind & Ponack, L.L.P.

(57) ABSTRACT

The information display device includes a surface member, a display, a light measurement unit, and a controller. The surface member is at least partially transmissive for light. The display is disposed on a back side of the surface member and is capable of displaying a display image including an information area for displaying information and a non-information area for displaying no information. The light measurement unit measures the amount of ambient light around the information display device. The controller acquires the amount of light measured by the light measurement unit and changes a pixel value of a display image according to the amount of light so that the display is difficult to be seen through a surface of the surface member.

8 Claims, 24 Drawing Sheets

Related U.S. Application Data

(60) Provisional application No. 62/750,820, filed on Oct. 26, 2018.

(51) Int. Cl.
  *G06F 3/041* (2006.01)
  *G09G 5/02* (2006.01)

(58) Field of Classification Search
  CPC .......... G09G 3/3406; G09G 2360/144; G09G 2320/0686; G06F 3/041; G06F 3/0412; G09F 9/35; G09F 27/005
  See application file for complete search history.

(56) References Cited

U.S. PATENT DOCUMENTS

| | | | |
|---|---|---|---|
| 2010/0014319 A1 | 1/2010 | Oversluizen et al. |
| 2012/0139956 A1 | 6/2012 | Joseph et al. |
| 2012/0154427 A1 | 6/2012 | Sugiyama |
| 2016/0360167 A1 | 12/2016 | Mitchell et al. |

FOREIGN PATENT DOCUMENTS

| | | |
|---|---|---|
| JP | 2007-334313 | 12/2007 |
| JP | 2011-257496 | 12/2011 |
| JP | 2012-118513 | 6/2012 |
| JP | 2012-128209 | 7/2012 |

OTHER PUBLICATIONS

International Search Report dated Jul. 30, 2019 in International (PCT) Application No. PCT/JP2019/018029.
Extended European Search Report dated Jan. 20, 2022 in European Application No. 19875222.2.

* cited by examiner

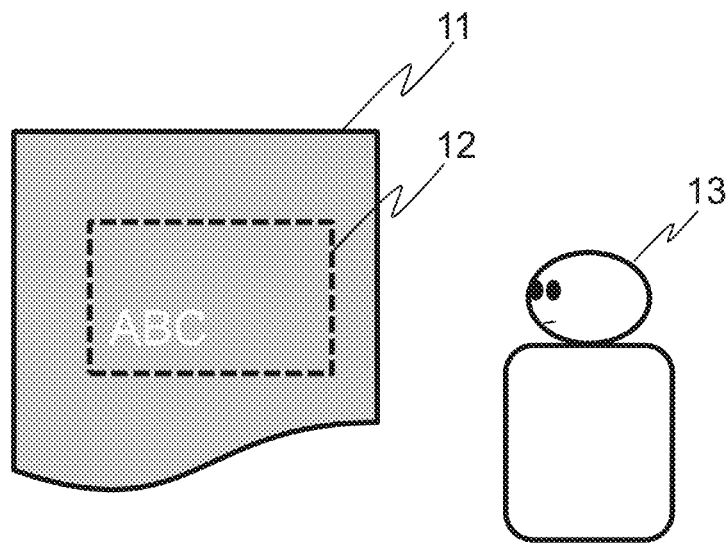
FIG. 12
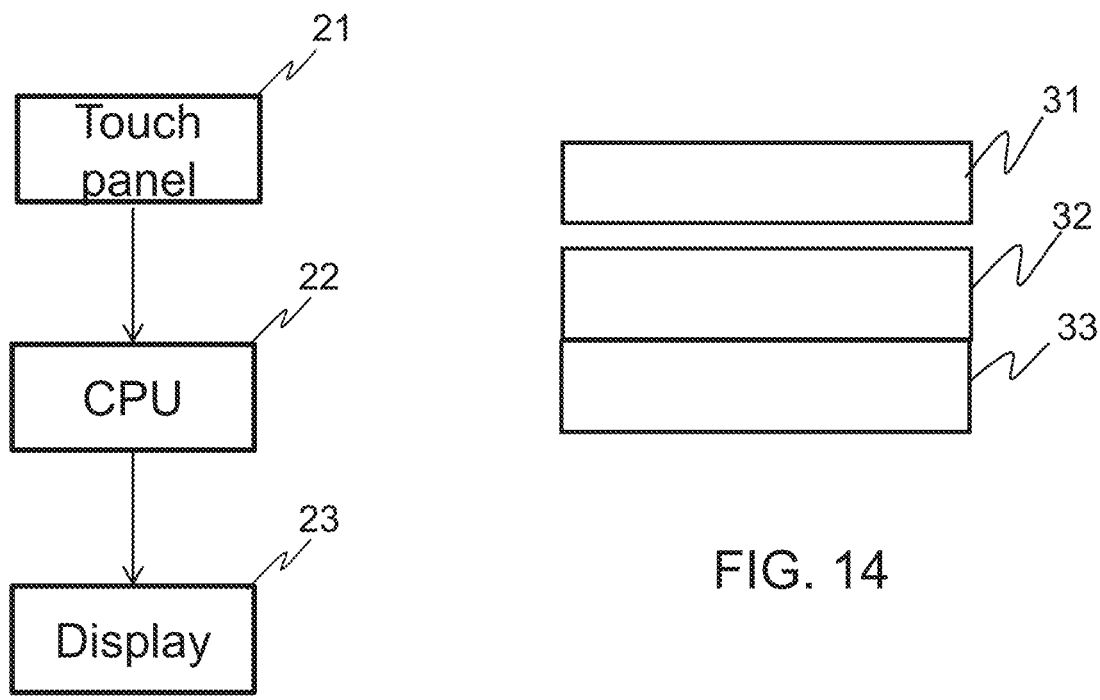
FIG. 13
FIG. 14

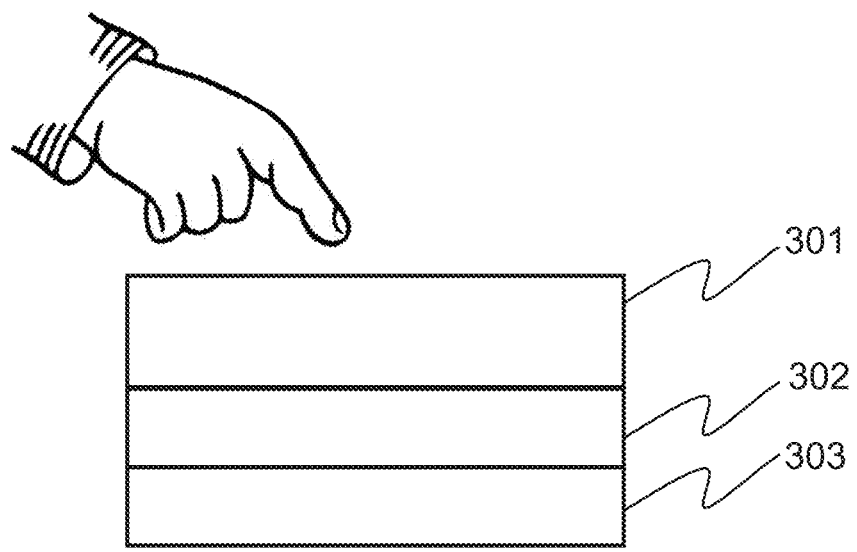
FIG. 30
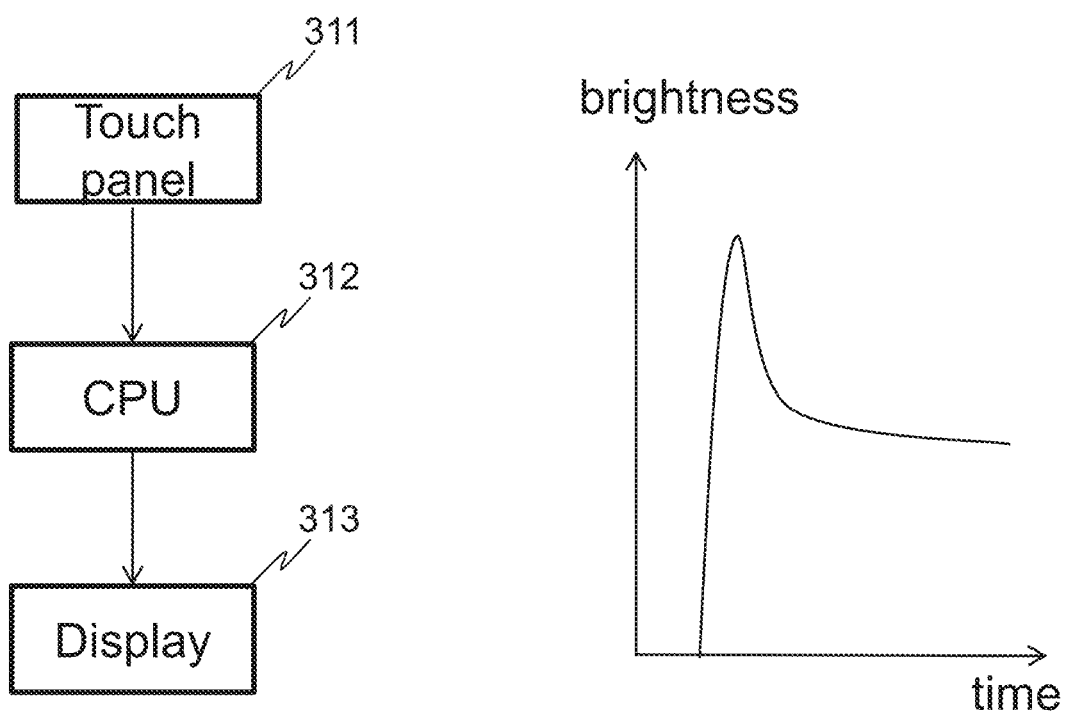
FIG. 31
FIG. 32

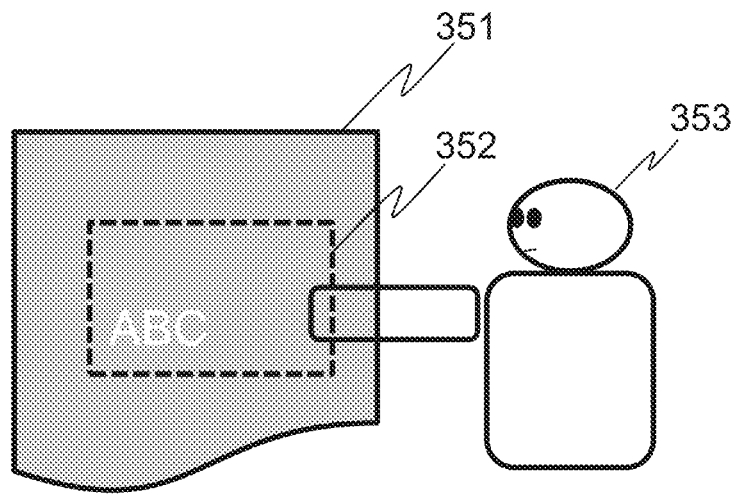
FIG. 35
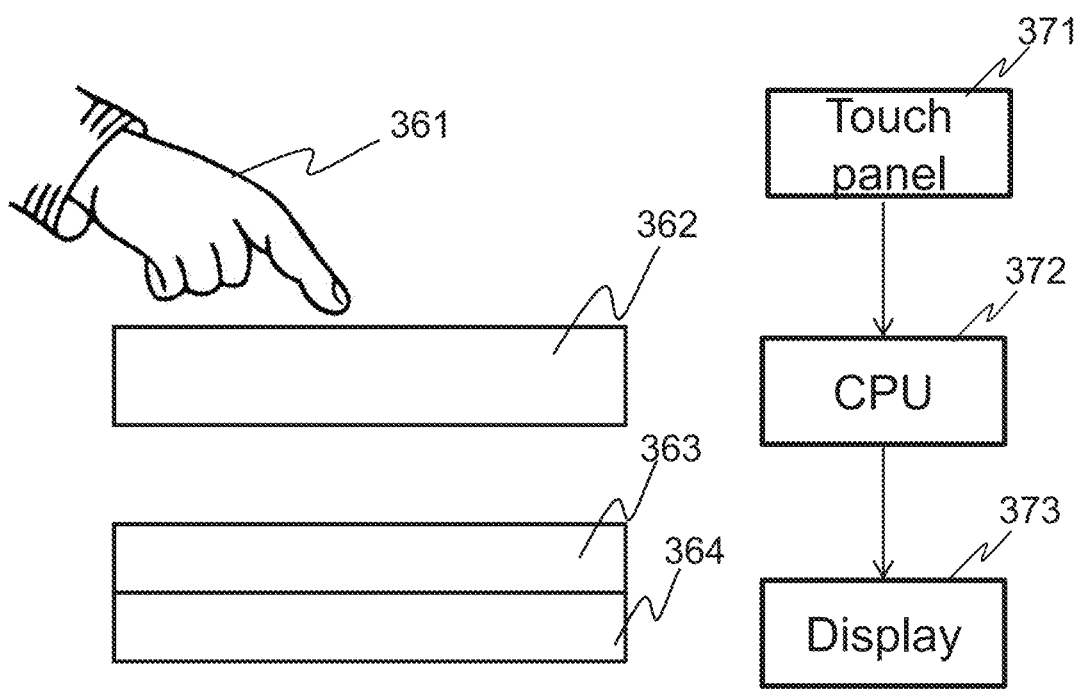
FIG. 36
FIG. 37

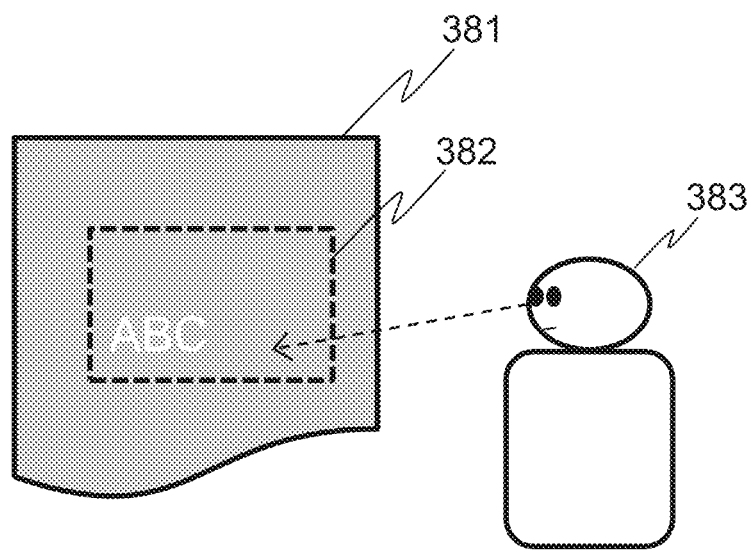
FIG. 38
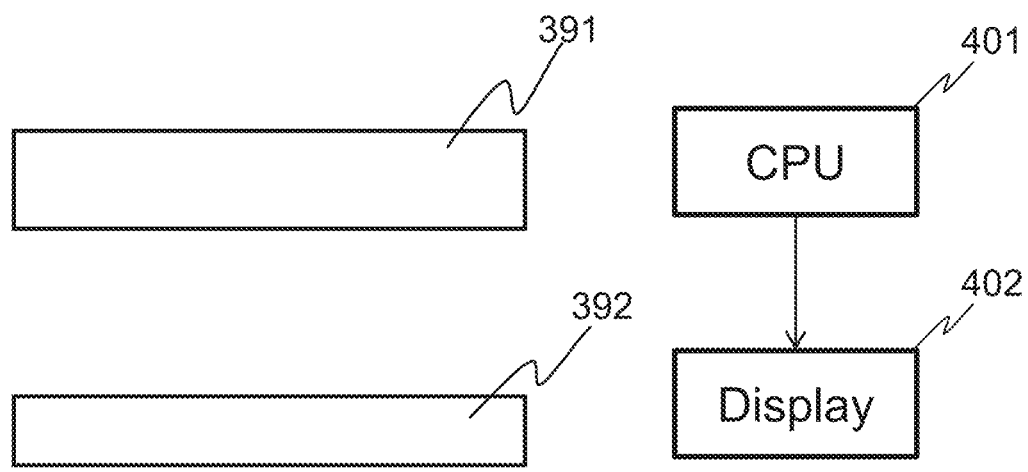
FIG. 39
FIG. 40

INFORMATION DISPLAY DEVICE AND INFORMATION DISPLAY METHOD

TECHNICAL FIELD

The present disclosure relates to an information display device comprising a display and an information display method.

BACKGROUND

A method is known in which, with an information display device comprising a display and a surface member, a content displayed on the display is shown through the surface member having a reflective content (see Patent Document 1).

SUMMARY

Technical Problem

In a case where the surface member is provided with a reflective layer as the information display device of Patent Document 1, light from the display is attenuated due to the transmittance of the reflective layer, and the light on the surface tends to be weakened. On the other hand, if the reflective layer is not provided, the surface of a display can been seen from the outside through the surface member.

The information display device and the information display method according to the present disclosure aim to display an image without making a user aware of presence of the display itself while suppressing attenuation of light from the display.

Solution to Problem

The information display device according to the present disclosure comprises a surface member, a display, a light measurement unit, and a controller. The surface member is at least partially transmissive for light. The display is disposed on a back side of the surface member and is capable of displaying a display image including an information area for displaying information and a non-information area for displaying no information. The light measurement unit is configured to measure an amount of ambient light around the information display device. The controller is configured to acquire the amount of ambient light measured by the light measurement unit and change a pixel value of the display image according to the amount of ambient light so that the display is difficult to be seen through a surface of the surface member.

The information display method according to the present disclosure uses a device comprising a surface member that is at least partially transmissive for light, a display disposed on a back side of the surface member, the display being capable of displaying a display image including an information area for displaying and a non-information area for displaying no information, a light measurement unit configured to measure an amount of ambient light around the information display device, and a controller configured to control the display. The information display method includes: changing a color of the non-information area to match a color of the surface member; acquiring the amount of ambient light measured by the light measurement unit; and changing brightness of the display image according to the amount of ambient light so that the display is difficult to be seen through a surface of the surface member.

BRIEF DESCRIPTION OF THE DRAWINGS

FIG. 12 is a view showing a usage environment of an information display device according to Embodiment 4.

FIG. 13 shows a configuration of a system for executing a function of the information display device according to Embodiment 4.

FIG. 14 shows a simplified layer structure of the information display device according to Embodiment 4.

FIG. 30 shows a simplified layer structure of an information display device according to Embodiment 13.

FIG. 31 shows a configuration of a system for executing a function of the information display device according to Embodiment 13.

FIG. 32 is a graph showing variation of screen brightness of the information display device with time according to Embodiment 13.

FIG. 35 is a view showing a usage environment of an information display device according to Embodiment 15.

FIG. 36 shows a simplified layer structure of the information display device according to Embodiment 15.

FIG. 37 shows a configuration of a system for executing a function of the information display device according to Embodiment 15.

FIG. 38 is a view showing a usage environment of an information display device according to Embodiment 16.

FIG. 39 shows a simplified layer structure of the information display device according to Embodiment 16.

FIG. 40 shows a configuration of a system for executing a function of the information display device according to Embodiment 16.

DETAILED DESCRIPTION

Hereinafter, embodiments will be described in detail with reference to the drawings as appropriate. Any explanations deemed unnecessary may be omitted. For example, detailed description of well-known aspects or duplicate description of substantially identical components may be omitted.

It is to be noted that the attached drawings and the following description are provided to enable those skilled in the art to fully understand the present disclosure, and they are not intended to limit the claimed subject matter.

In the following description, unless otherwise specified, the "front side" of an information display device is a side where the ambient light is incident or a side closer to a user who sees the information display device. The "back side" is an opposite side of the "front side" and is a side from which light from a display is emitted or guided. Further, the "information area" of a display means an area for displaying specific information (including characters, images, and figures) whose meaning can be understood by a person, among images that can be displayed by the display. The "non-information area" means an area for displaying a screen background (including color, pattern, design, etc.).

Embodiment 1

Figure 1:
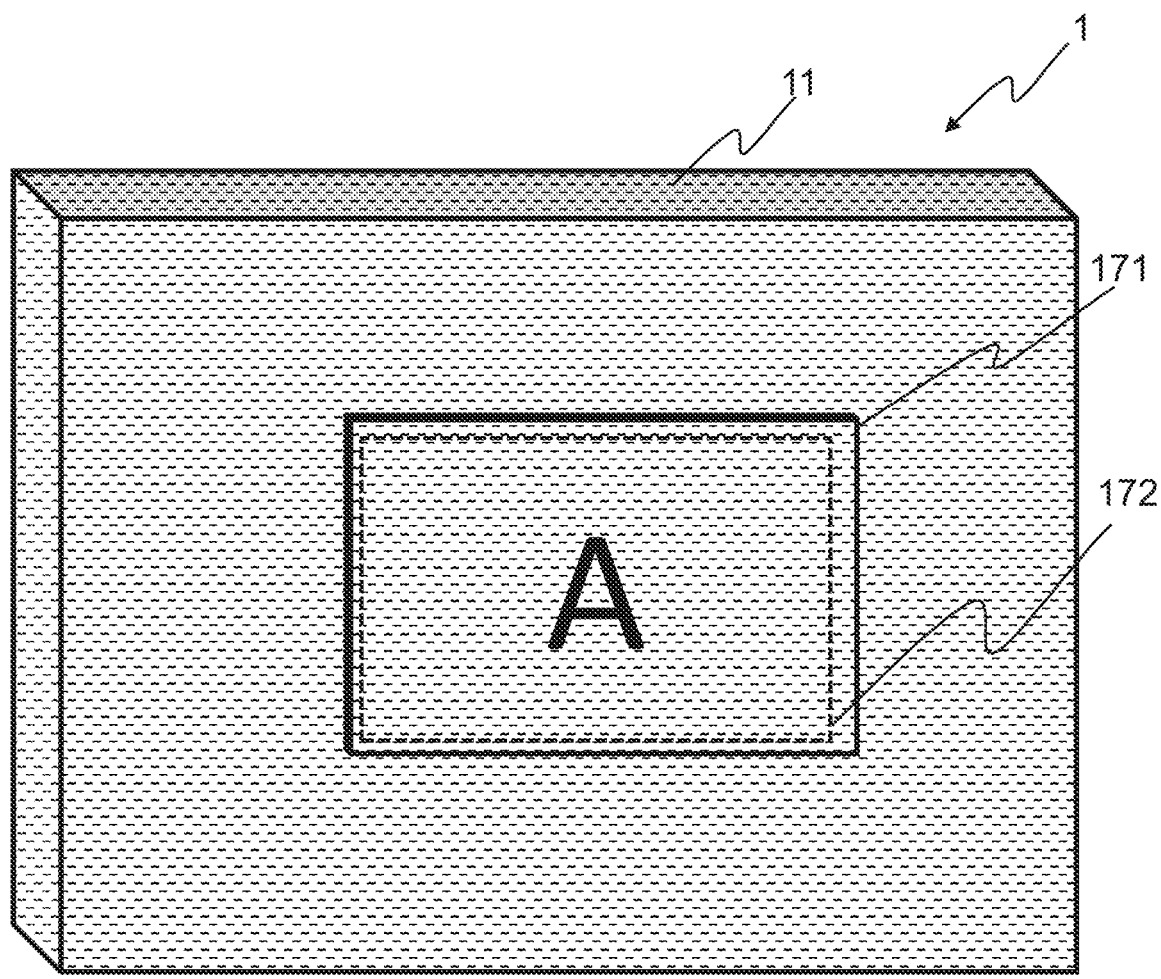
FIG. 1 shows an appearance of an information display device according to Embodiment 1.
Figure 1:
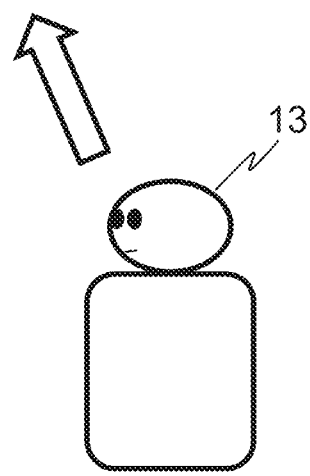
Figure 2:
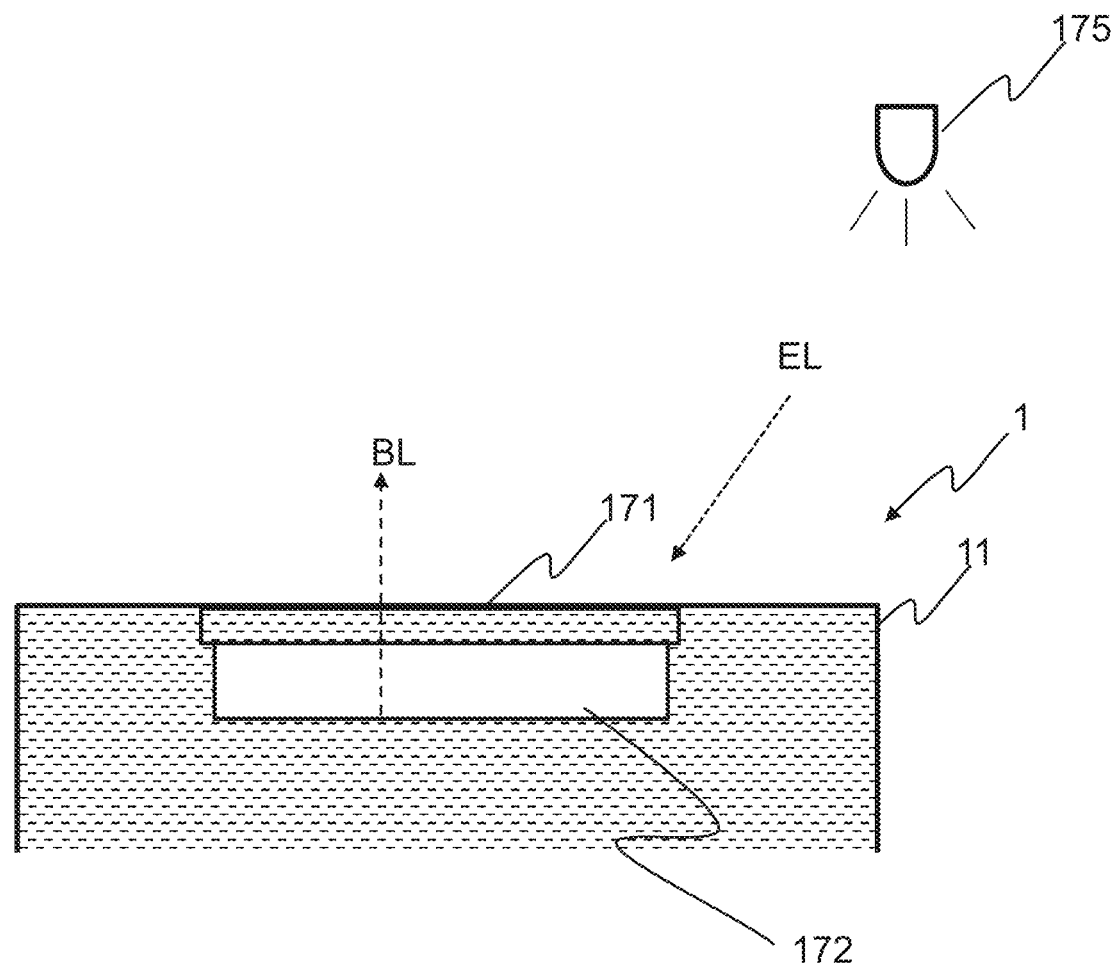
FIG. 2 shows a simplified layer structure of the information display device according to Embodiment 1.

The information display device 1 of Embodiment 1 is installed on a wall surface 11 as shown in FIGS. 1 and 2. The information display device 1 comprises a surface member 171 and a display 172. A user 13 visually recognizes information displayed by the display 172 through the surface member of the wall surface 11. The user 13 is, for example, an aircraft passenger. The information contents displayed by the display 172 include, for example, operation information for a seat or an information terminal attached to the seat, transit information, seat lighting control, audio control, "Do not Disturb" setting, entertainment device control, seat reclining, attendant call and its cancellation, weather information, information such as flight time and local time, seat numbers, etc.

The surface member 171 is made of a material having predetermined light transmittance. The surface member 171 has an identical or similar surface as the material covering a surface of the wall surface 11. With this configuration, the user 13 visually recognizes the displayed information without being aware of presence of the display 172. For example, the surface member 171 is composed of a material such as wood grain, cloth grain, leather, stone, a film material imitating those materials, or a transparent or translucent material whose surface is decorated by painting or printing. The surface member 171 may have a surface area larger than that of the display 172, or may have a similar surface area. The surface member 171 may form a portion or all of the wall surface 11. Accordingly, the surface member 171 is disposed such that the presence of the display 172 is unnoticeable. The surface member 171 may be partially, but not entirely, transmissive. A portion of the surface member 171 may be composed of a material that allows light to pass through, and the other portion may be composed of a material that does not allow light to pass through.

There may be a boundary between the wall surface 11 and the information display device 1. With this configuration, the device can be easily removed for maintenance.

The display 172 is, for example, a liquid crystal display. The display 172 includes a color filter, a liquid crystal panel, and a light source such as an LED (all of which are not shown). A display image including specific information and a screen background including colors or a pattern is visibly displayed on the display 172 by light BL from the light source such as an LED.

With the information display device 1 having the above configuration, information such as necessary operation information appears on the wall surface 11 on which the user 13 previously saw nothing. This can amaze the user 13. In particular, a combination of the surface member 171 and the display 172 can create a space for the user 13, in which the user can see, for example, uneven wood grains, an object or fantasy object on the wall that does not actually exist.

The information display device 1 having the above configuration has the following problems.

Figures 3A, 3B:
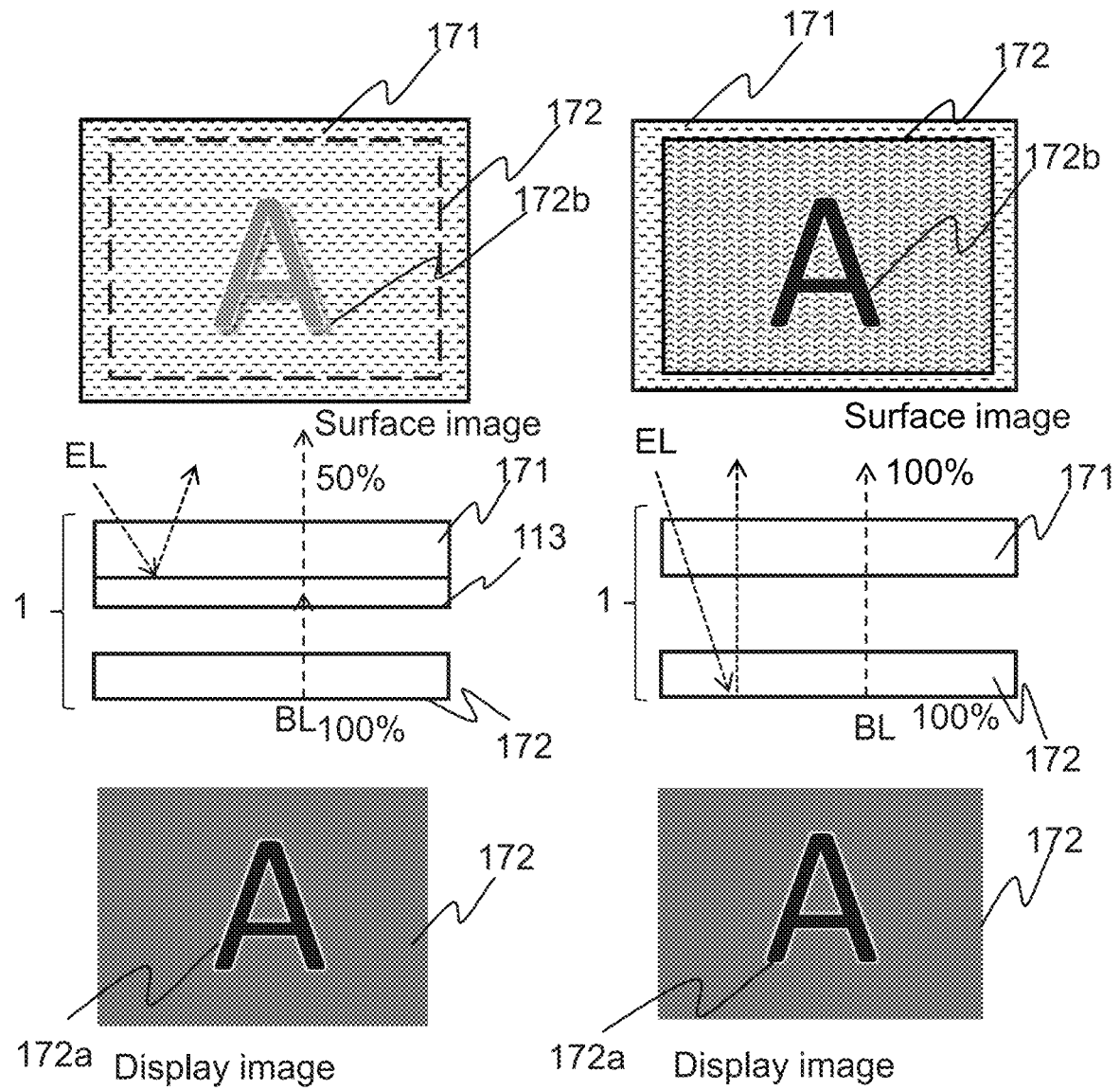
FIG. 3A is a view for explaining how an information display device according to a comparative example operates.
FIG. 3B is a view for explaining how an information display device according to a comparative example operates.

FIG. 3A shows a display operation of the information display device 1 which includes a reflective layer 113. The reflective layer 113 is composed of, for example, a half mirror. Reference numeral 172a designates a display image which is an image displayed by the display 172, and reference numeral 172b designates a surface image which is an image that a user can see through the surface member 171.

In a case where the ambient light EL generated by a light device 175 (FIG. 2) has constant luminance, for example, 300 lux or more, when the information display device 1 has a reflective layer as shown in FIG. 3A, constant attenuation of brightness occurs in the information area displaying information (a letter "A" in the illustrated example) on the display 172 through the reflective layer 113. As shown in FIG. 3A, the brightness decreases by, for example, 50%. On the other hand, in the area where no information is displayed (an area other than the portion displaying the letter "A" in the illustrated example), the reflective layer 113 reflects the ambient light EL and the reflected light passes through the surface member 171 to show the color of the surface member. In this mode, since the information display device 1 includes the reflective layer 113, the light BL from the display 172 is attenuated due to the transmittance of the reflective layer 113, and therefore, the light through the surface tends to be weakened. Therefore, the surface image 172b appears blurry.

As shown in FIG. 3B, if the information display device 1 is not provided with a reflective layer, the light BL from the display 172 directly passes through the surface member 171 so that the user can see the information area more clearly in the surface image 172b. However, since the ambient light EL passes through the surface member 171 and reaches the display 172, the surface of the display 172 can be also seen from the outside. As a result, the display 172 shows through the surface member 171 and the color of the surface member 171 cannot be sufficiently seen.

Therefore, the information display device 1 according to Embodiment 1, which is not provided with a reflective layer, produces a display image so that a background color of the display 172 matches the color of the surface member, as will be described later. As a result, even if no reflected light of the ambient light EL as shown in FIG. 3A is obtained, the user can see only the surface member 171 in a place where no information is displayed, and suppresses appearance of the color of the display 172. Further, since no reflective layer is provided, it is possible to minimize attenuation of the brightness of a portion where information is displayed.

When the above mode is adopted, if the amount of ambient light EL is reduced, that is, if it becomes dark, the surface member 171 may appear to shine. This can cause an unnatural appearance of the device for the user. In Embodiment 1, when the amount of ambient light is reduced, that is, when it becomes dark (for example, 100 lux or less), the brightness of a portion where no information is displayed is suppressed by using ambient light measuring means, and emission of the light from the display 172 is suppressed to the minimum. In this case, the ambient light EL may pass through the surface member 171 and the color of the surface of the display 172 may be seen through. However, since the amount of ambient light EL is small and it is dark, the difference of colors between the display and the surface member 171 is not likely to be distinct even if the color (black) of the display 172 which is turned off can be seen through the surface member.

1-1. Configuration

Figure 4:
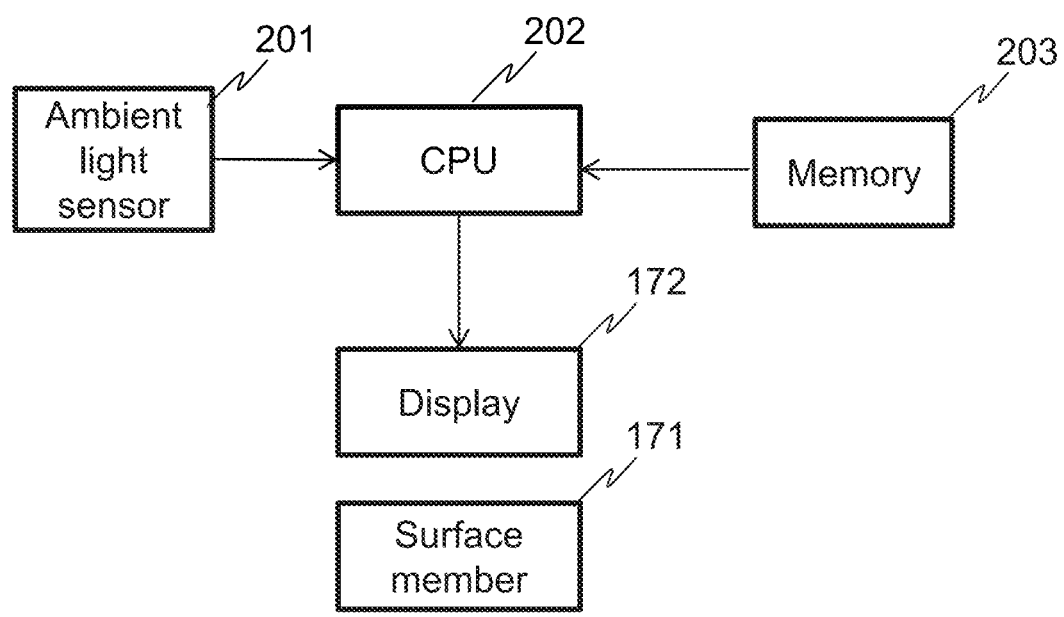
FIG. 4 shows a configuration for executing a function of the information display device according to Embodiment 1.

In order to execute the above function, the information display device 1 according to Embodiment 1 comprises an ambient light sensor 201, a CPU 202, and a memory 203 as shown in FIG. 4. The ambient light sensor 201 (an example of a light measurement unit) is, for example, an illuminance sensor. The CPU 202 (an example of a controller) includes circuitry that executes predetermined processes according to a program stored in the memory 203. The CPU 202 acquires the amount of ambient light detected by the ambient light sensor 201. The memory 203 stores programs and data. The memory 203 stores surface member information in advance. The surface member information includes information indicating pixel values representing at least either one of the color or the brightness of the surface member 171. The pixel values are, for example, numerical values indicating RGB values or brightness.

The memory 203 may store a plurality of types of surface member information, and the CPU 202 may acquire the closest surface member information according to the environment in which the information display device 1 is installed.

1-2. Operation

The operation of the information display device 1 will be described with reference to FIGS. 5 and 6.

Figure 5:
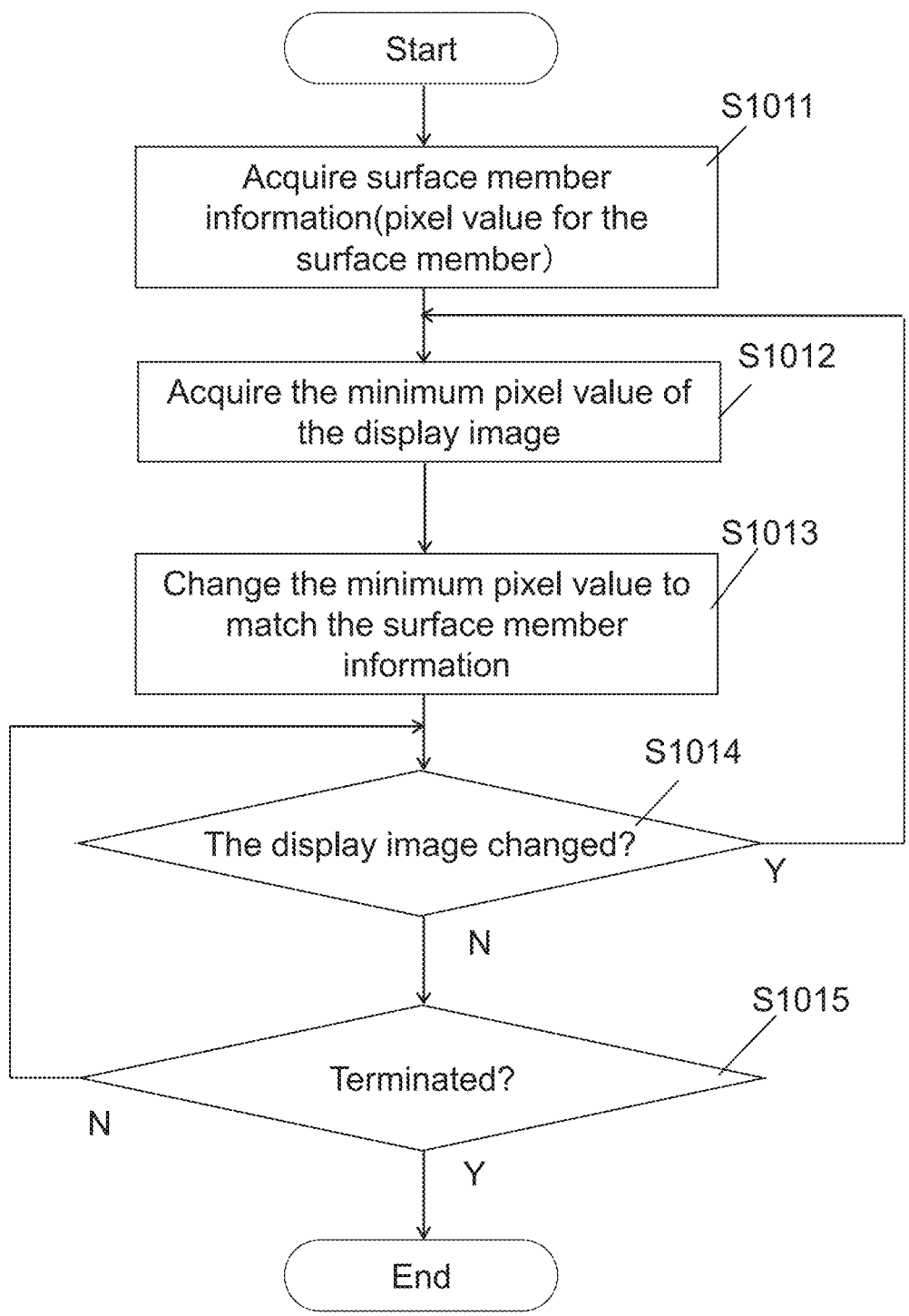
FIG. 5 is a flowchart showing an operation of the information display device according to Embodiment 1.

FIG. 5 shows an operation for matching the background color of the display 172, that is, the color of the non-information area with the color of the surface member 171. When the power of the information display device 1 is turned on, the CPU 202 acquires surface member information from the memory 203 (S1011). The CPU 202 acquires the minimum pixel value of the display image displayed by the display 172 (S1012). Here, the minimum pixel value, that is, the darkest image area is considered as indicating a non-information area. The CPU 202 changes the minimum pixel value to match the pixel value included in the surface member information (S1013). As a result, the non-information area in the display 172 appears to be assimilated with the surface member 171. Therefore, the user can see the information through the surface member 171 without being aware of the presence of the display 172.

If there is a change in the display image (Yes in S1014), the CPU 202 returns to step S1012 and repeats the processes of steps S1012 to S1014.

The CPU 202 terminates the processing when a termination condition is satisfied, for example, when the power of the information display device 1 is turned off (S1015).

In the above example, the minimum pixel value may indicate a specific numerical range equal to or larger than the minimum pixel value. For example, a dark image portion where almost no information is displayed may be matched to the color of the surface member 171.

Figure 6:
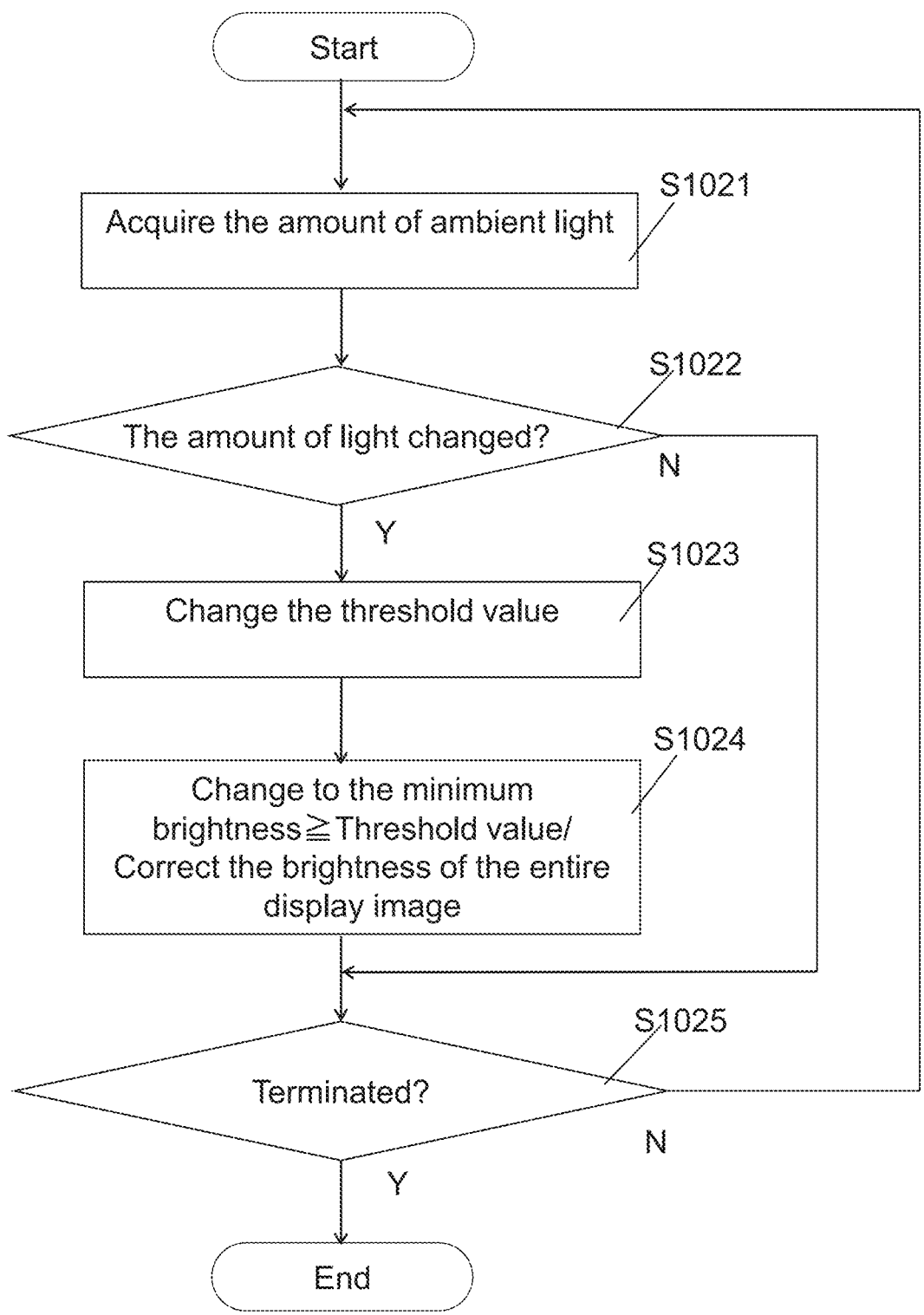
FIG. 6 is a flowchart showing an operation of the information display device according to Embodiment 1.

FIG. 6 shows an operation for changing the brightness of a display image according to the amount of ambient light. The operation in FIG. 6 may be performed concurrently with the operation of in FIG. 5. The CPU 202 executes image control so as not to fall below a predetermined threshold value indicating the minimum brightness stored in the memory 203.

Figures 7A, 7B:
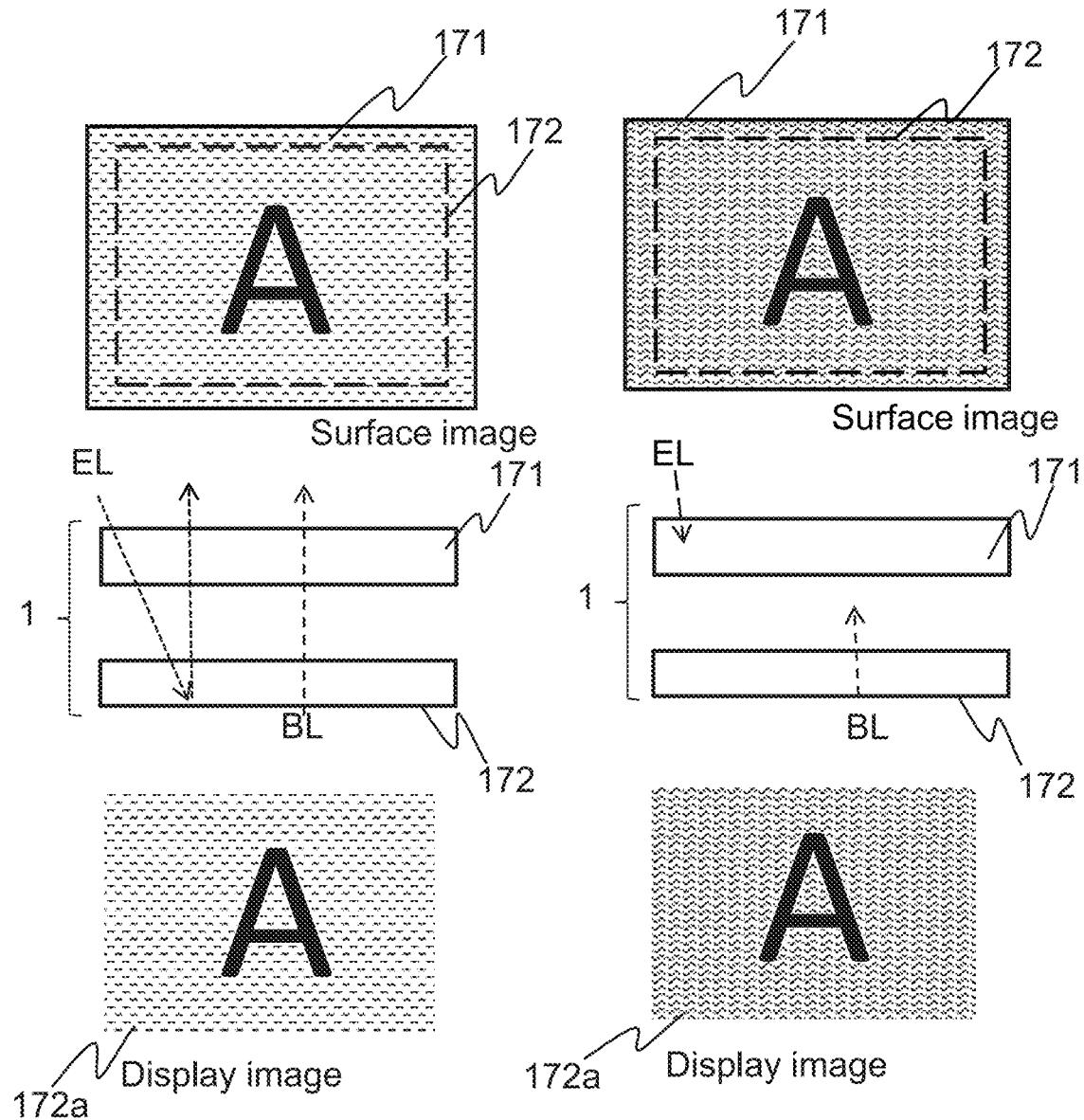
FIG. 7A is a view for explaining how the information display device according to Embodiment 1 operates.
FIG. 7B is a view for explaining how the information display device according to Embodiment 1 operates.

The CPU 202 acquires the amount of ambient light from the ambient light sensor 201 (S1021). When there is a change in the amount of light (Yes in S1022), the CPU 202 changes the threshold value (S1023). For example, when the amount of light increases, the threshold value is raised, and when the amount of light decreases, the threshold value is lowered. The CPU 202 controls so that the minimum brightness of a display image is changed to be equal to or higher than the threshold value to correct the brightness of the entire display image (S1024). When the threshold value is raised (that is, when the amount of ambient light increases), the display image 172a becomes brighter as shown in FIG. 7A. When the threshold value is lowered (that is, when the amount of ambient light decreases), the display image 172a becomes darker as shown in FIG. 7B. As a result, the brightness of the surface image 172b seen through the surface member 171 by a user is changed according to the amount of ambient light EL incident on the surface member 171. As a result, the surface of the display 172 becomes unlikely to be seen through the surface member 171.

The CPU 202 terminates the processing when a termination condition is satisfied, for example, when the power of the information display device 1 is turned off (S1025).

1-3. Features, Etc.

The information display device 1 according to Embodiment 1 displays information through the surface member 171 by the display 172 and has no reflective layer for reflecting ambient light EL at least on the front side of the surface member 171 and between the surface member 171 and the display 172. The area where no information is displayed shows the same color as the surface member. As a result, it is possible to reduce factors that can attenuate the brightness of the area where information is displayed to the minimum. Accordingly, it is possible to provide a user (for example, an aircraft passenger) with a high brightness and easy-to-see display. Further, by controlling the brightness of a display image according to increase or decrease of the amount of ambient light, it is possible to prevent the display 172 from being seen through the surface member 171.

1-4. Modification Example

In Embodiment 1, the ambient light sensor 201 is used as means for measuring brightness of the environment, but this is not the only option. Alternatively, a camera or other type of sensor may be used to determine the amount of light or brightness. Instead of using an ambient light sensor, it is also possible to estimate the ambient light by obtaining a control signal of a light device.

Embodiment 2

In the following description, the members having the same names as those in the above-mentioned Embodiment may be designated by different reference numerals but may have the same configurations and functions as those in the above-mentioned Embodiment. Description of the configurations and the functions that have already been described may be omitted.

Figure 8:
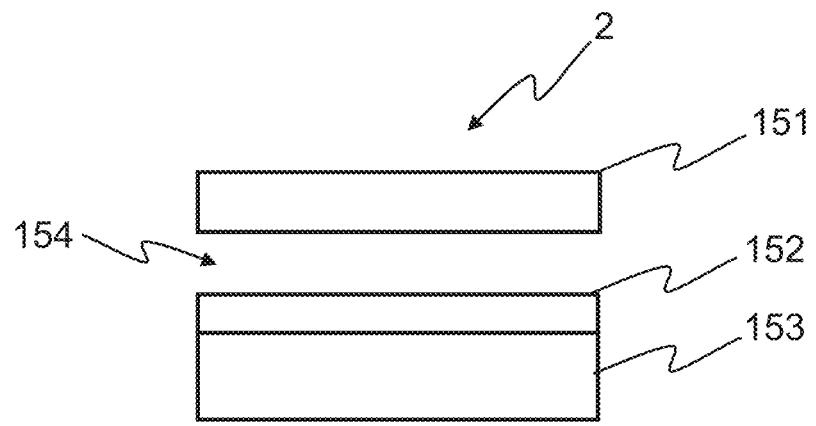
FIG. 8 shows a simplified layer structure of an information display device according to Embodiment 2.

FIG. 8 shows the configuration of the information display device 2 in Embodiment 2.

The information display device 2 comprises a surface member 151, a view filter (an example of a viewing angle control filter) 152, and a display 153. The configuration may further include a gap 154 between the surface member 151 and the display 153.

Figure 9A:
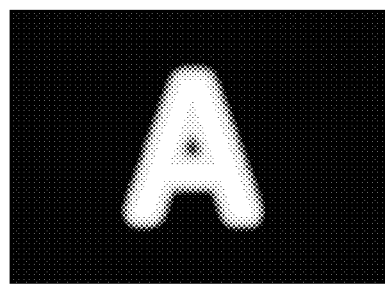
FIG. 9A shows an example of a display image with no view filter.
Figure 9A:
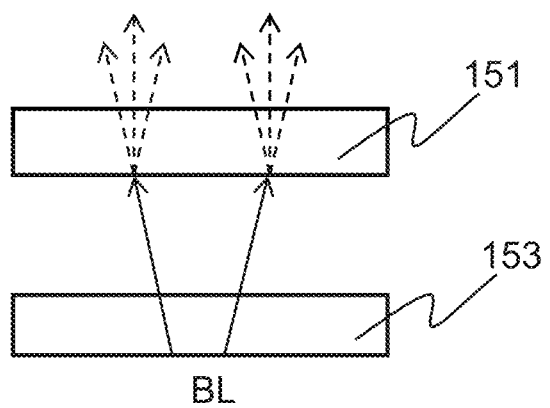
Figure 9B:
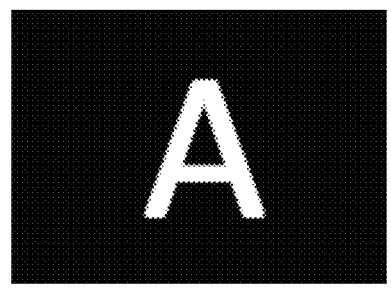
FIG. 9B shows an example of a display image with a view filter.
Figure 9B:
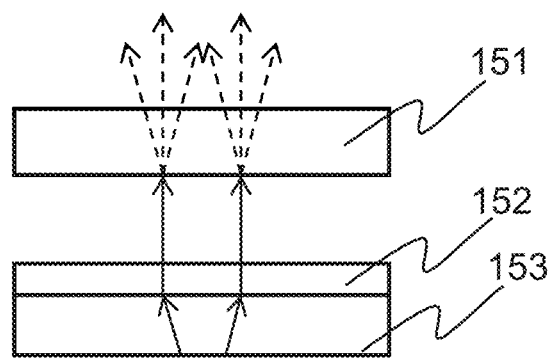

FIGS. 9A and 9B are views for explaining an effect of the view filter 152 in Embodiment 2.

Since the surface member 151 scatters the light from the display 153, a display image of the display 153 gets blurred and difficult to be seen on the surface member 151. In particular, as the gap 154 is larger, the image gets blurrier. In order to prevent this, efforts have been made to bring the display 153 as close as possible to the surface member 151.

In view of the above, in this Embodiment, the view filter 152 is disposed on the display 153 to correct the light emitted from the display 153 in the vertical direction. As a result, the influence of the gap 154 can be reduced, and the influence of light scattering on the surface member 151 can be reduced.

As the light source for the display 153 in this Embodiment may be, for example, an LED, or may be a reflector (not shown) to use reflected light of the ambient light.

The view filter 152 has a property of limiting transmission of light in all directions other than substantially a normal direction to the surface of the display 153, and limits the incident light rays to a substantially vertical direction. In a case where the display 153 is a general liquid crystal display and has a viewing angle of 130 degrees and the gap 154 is 2 mm, the projection of a 1 mm width line on the display 153 makes a width of about 9.5 mm on the surface member 151. Considering the scattering of light on the surface member 151, blurring of image will be larger than that. If the view filter 152 having a viewing angle of 60 degrees is disposed therebetween, the projection width on the surface member 151 can be reduced to about 3 mm.

Similar effect can be obtained even if the gap 154 is filled with other member.

Embodiment 3

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 10:
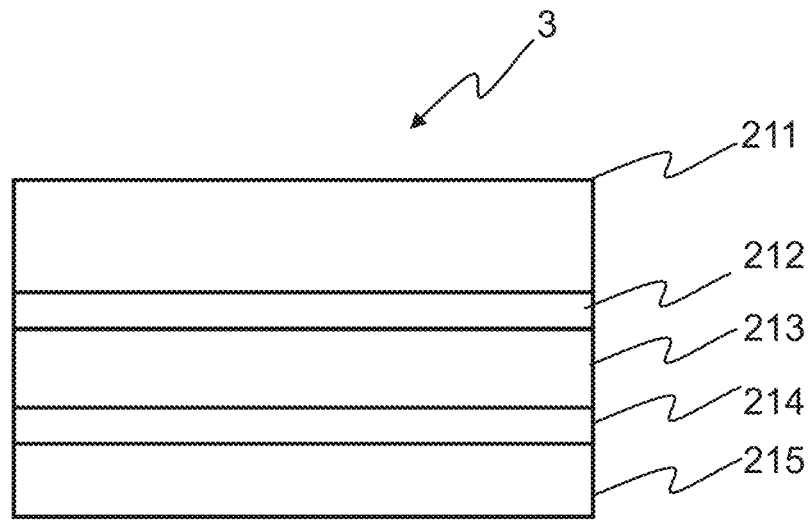
FIG. 10 shows a simplified layer structure of an information display device according to Embodiment 3.

FIG. 10 shows a configuration of an information display device 3 in Embodiment 3.

The information display device 3 comprises a surface member 211, a reflective layer 212, a touch panel 213, a view filter (viewing angle control filter) 214, and a display 215.

The reflective layer 212 is made of a half mirror or such other member. The touch panel 213 detects a touch by a user, which a CPU (not shown) analyzes to enable a change of a display image and/or other operation of the information display device.

Figure 11:
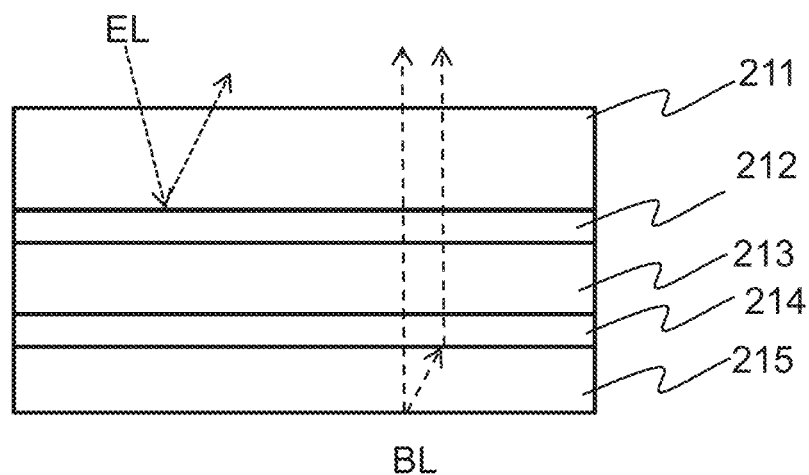
FIG. 11 is a view for explaining how the information display device according to Embodiment 3 operates.

As shown in FIG. 11, the reflective layer 212 is disposed on an outermost surface to such an extent that it does not affect an appearance of the display device. With this configuration, the ambient light EL reflected by the reflective layer 212 returns to a front side, so that the effect of the color of the surface member 211 is enhanced. On the other hand, the view filter 214, which serves to prevent blurring, is disposed in a layer as close to the light source of the display 215 as possible. This configuration is effective in suppressing diffusion of light from the display 215. In order to maximize these effects, the information display device 3 comprises the surface member 211, the reflective layer 212, the touch panel 213, the view filter 214, and the display 215, which are arranged in this order from the front side.

The touch panel 213 may comprise a touch sensor or such other member. The display 215 may include a light source such as a matrix LED or a common LED, or a reflector for using ambient light EL.

Embodiment 4

In the following description, the members having the same names as those in the above-mentioned Embodiments may be designated by different reference numerals but may have the same configurations and functions as those in the above-mentioned Embodiments. Description of the configurations and the functions that have already been described may be omitted.

FIG. 12 shows a usage environment of the information display device in this Embodiment.

The usage environment in this Embodiment is composed of a wall surface 11, an operation screen 12, and a user 13.

The outline of an operation of the information display device of this Embodiment will be described with reference to FIG. 12. The information display device of this Embodiment comprises a display installed behind a wall surface 11, and shows to the user 13 a content that is displayed by the display so as to be seen on a surface of the wall surface 11 through a surface material of the wall surface 11.

FIG. 13 is a system configuration view of the information display device of this Embodiment. The information display device comprises a touch panel 21, a CPU 22, and a display 23.

The touch panel 21 detects an input by the user 13 through the wall surface 11, which the CPU analyzes to enable the wall built-in information display device to be operated.

The touch panel may be a touch sensor. The display can be used to just display logos or symbols or used as a light device, etc. without a touch panel or touch sensor.

FIG. 14 is a structural sectional view of the information display device of this Embodiment. The information display device comprises a surface member 31, a touch panel 32, and a display 33.

The surface member 31 is made of a material having a certain degree of transmittance and have a surface whose material has the same or similar surface as a material covering the surface of the wall surface 11. With this configuration, the user 13 can be unaware of the presence of the information display device. For example, the surface member may be made of a genuine material such as wood grain, cloth grain, leather, stone, a film material that imitates these materials, or a transparent or translucent material whose surface is decorated by painting or printing. This allows the information display device to show a content while the user is not aware of the presence of the information display device.

If the design allows, there may be a boundary between the wall surface 11 and the information display device. This is effective in easy removal of the information display device in terms of maintainability.

The surface member 31 may be partially transmissive and have such a configuration that only necessary portions show a content while the other portions do not pass light. For example, a transmissive portion may be provided for a specific symbol shape to clearly show the symbol.

The surface member 31 is frequently touched by a user, and therefore, it is desirable for the surface member to have a certain level of hard coating.

The information display device may have functions such as wireless charging, and/or near field communication (NFC) disposed on a back side of the wall surface 11 in place of the touch panel or in addition to the touch panel.

The display may be, for example, a liquid crystal display, an OLED, a matrix LED, or such other display device, or a device that can be used as a light source.

Assuming that the information display device is used in an aircraft, the information and operation contents provided to a user 13 (for example, a passenger of an aircraft) may include, for example, transit information, seat lighting control, audio control, "Do not Disturb" settings, entertainment equipment control, seat reclining, attendant call and its cancellation, weather information, information such as flight time and/or local time, and/or seat number presentation.

Accordingly, in a narrow space such as around a seat in an aircraft, multiple functions such as seat reclining, air conditioning, and/or lighting need to be controlled. Even in such situations, the above configuration makes it possible to use a high-quality deign wall as a controller with multiple functions or an information display terminal.

Further, the information display device does not have physical buttons on the surface and therefore less unevenness. Considering that the device is used by an unspecified number of people, this configuration makes it possible to easily wipe off dirt due to spilling of juice, etc., thereby reducing the risk of failure in operation of the device.

Further, for the user 13, the necessary operation system and information are displayed through the wall surface 11 which previously showed nothing, which can amaze the user.

In particular, in combination with the surface member 31, it is possible to show the surface as if there is, for example, uneven wood grain, an imaginary object or something that does not actually exist on the wall, or to create an entertaining space for the user.

Embodiment 5

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 15:
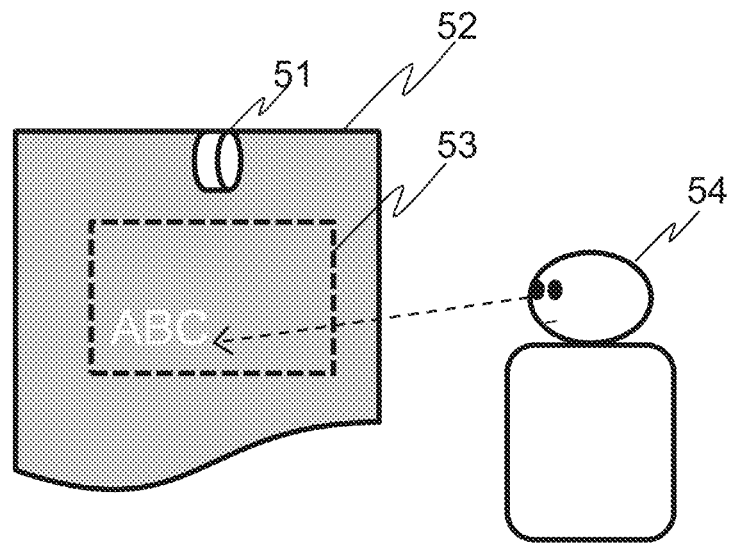
FIG. 15 shows a usage environment of an information display device according to Embodiment 5.

FIG. 15 is a view showing a usage environment of the information display device in this Embodiment.

The usage environment in this Embodiment is composed of a camera 51, a wall surface 52, a display 53, and a user 54.

The outline of an operation of the information display device of this Embodiment will be described with reference to FIG. 15.

The basic operation of the information display device of this Embodiment is the same as that of Embodiment 1. The exception is that the information display device of this Embodiment further comprises a camera 51, detects the line of sight of the user 54 using the camera 51, and displays an operation screen on the display 53 in the direction of the line of sight of the user 54. With this configuration, it is possible to configure an easy-to-use information display device that can display an operation screen in the direction of the user's line of sight.

Figure 16:
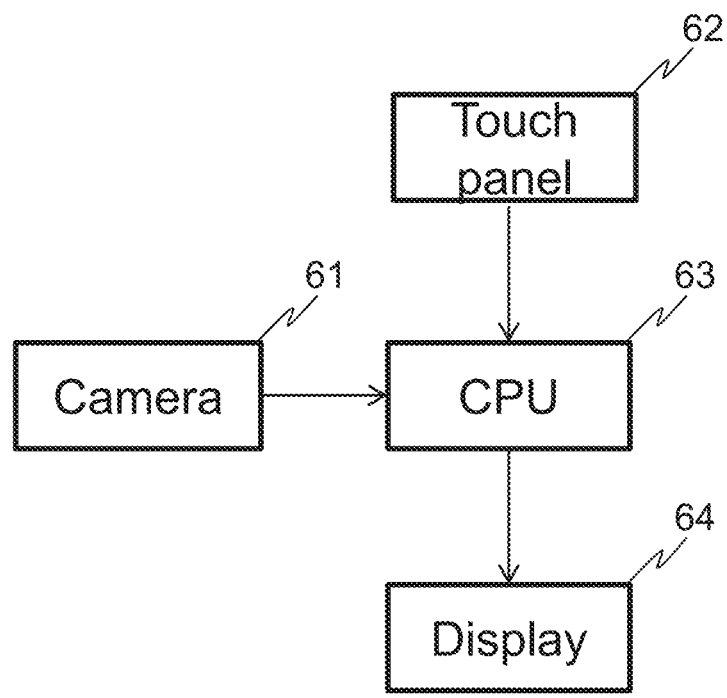
FIG. 16 shows a configuration of a system for executing a function of the information display device according to Embodiment 5.

FIG. 16 is a configuration view of an information display device in this Embodiment. As shown in FIG. 16, the information display device comprises a camera 61, a touch panel 62, a CPU 63, and a display 64.

The CPU 63 analyzes an image of a user 54 acquired from the camera 61 to analyze the user's line of sight. Based on the analyzed user's line of sight, the CPU 63 displays an operation screen on the display 64 at a location as an extension of the user's line of sight.

With the above operation, in this Embodiment, an operation screen is displayed in the direction of the user's line of sight, and therefore, it is possible to configure an information display device that is easy for the user to use.

In this Embodiment, a camera is taken as an example of the line-of-sight detection means, but other line-of-sight detection means may be used. Another example of the line-of-sight detection means may include a head location detection sensor attached to a user's head or a reclining angle detection sensor for a seat.

When there are a plurality of displays, a display on the extension of the line of sight may be selected for displaying an operation screen.

Embodiment 6

In the following description, the members having the same names as those in the above-mentioned Embodiments may be designated by different reference numerals but may have the same configurations and functions as those in the above-mentioned Embodiments. Description of the configurations and the functions that have already been described may be omitted.

The usage environment and configuration views of the information display device in this Embodiment are shown in FIGS. 15 and 16 similarly to Embodiment 5.

The basic operation of the information display device is the same as that of Embodiment 5.

The exception is that in this Embodiment, the camera 51 is used as action detection means for the user 54, and an operation screen is not displayed when the user 54 is in an inactive state in which the user's eyes are closed or there is no body movement.

With this configuration, the information display device does not display an operation screen when the user is inactive such as in a sleeping state, and therefore does not disturb the user and can save power.

In this Embodiment, a camera is taken as an example of action detection means, but other action detection means may be used. An example of other action detection means may include an action detection sensor worn by a user.

Embodiment 7

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 17:
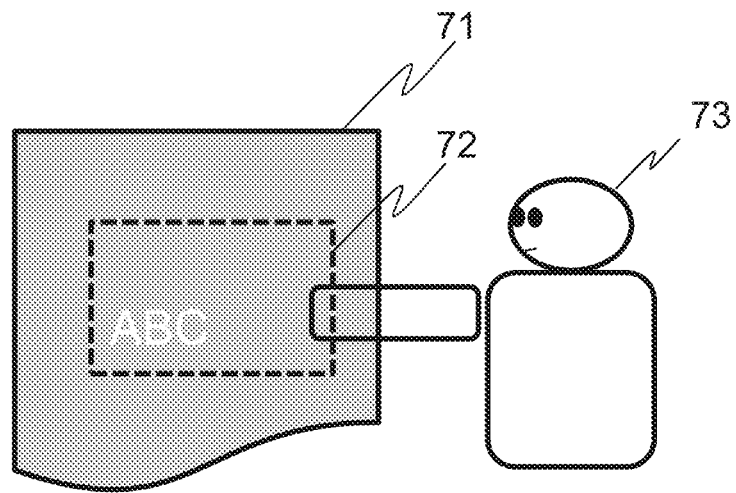
FIG. 17 is a view showing a usage environment of an information display device according to Embodiment 7.

FIG. 17 is a view showing a usage environment of the information display device in this Embodiment.

The usage environment in this Embodiment is composed of a wall surface 71, a display 72, and a user 73.

The outline of an operation of the information display device of this Embodiment will be described with reference to FIG. 17.

The basic operation of the information display device of this Embodiment is the same as that of Embodiment 1. The exception is that a hand location sensor is built in the wall surface 71 to detect movement of the user 73's hand, and an operation screen is displayed on the display 72 near the detected location of the user 73's hand. With this configuration, it is possible to configure an easy-to-use information display device that can display an operation screen at a hand of the user 73 who is actually operating the device.

Figure 18:
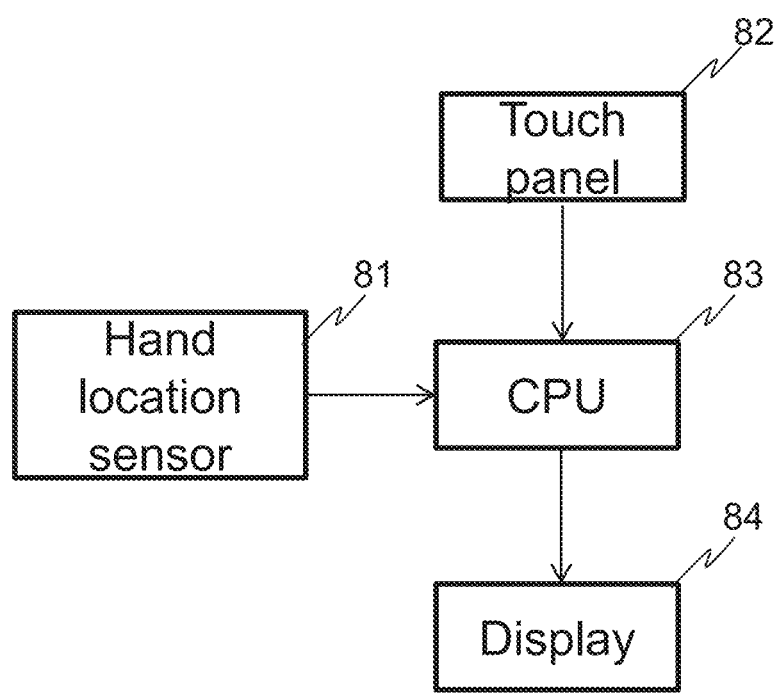
FIG. 18 shows a configuration of a system for executing a function of the information display device according to Embodiment 7.

FIG. 18 is a configuration view of an information display device in this Embodiment. As shown in FIG. 18, the information display device comprises a hand location sensor 81, a touch panel 82, a CPU 83, and a display 84.

The CPU 83 receives location information of the user's hand detected by the hand location sensor 81, and the display 84 displays an operation screen at a location corresponding to the detected location of the user's hand.

With the above operation, in this Embodiment, an operation screen is displayed at a location of the user's hand, and therefore, it is possible to configure an easy-to-use information display device for the user.

An example of a hand location sensor in this Embodiment may include an infrared location sensor, a camera, or such other device.

Embodiment 8

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 19:
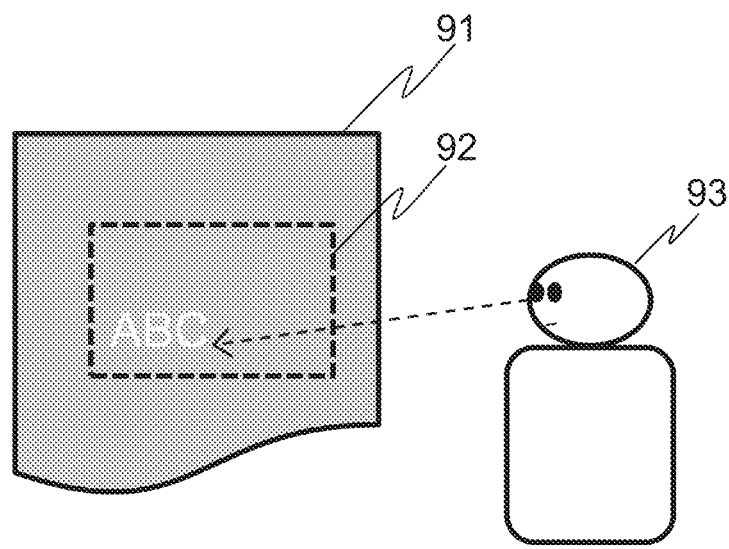
FIG. 19 is a view showing a usage environment of an information display device according to Embodiment 8.

FIG. 19 is a view showing a usage environment of an information display device in this Embodiment.

The usage environment in this Embodiment is composed of a wall surface 91, an operation screen 92, and a user 93.

The outline of an operation of the information display device of this Embodiment will be described with reference to FIG. 19.

The basic operation of the information display device of this Embodiment is the same as that of Embodiment 1. The exception is that a touch of the user 93 is detected by a touch panel (not shown) installed in the operation screen 92, and the operation screen is displayed at a desired location of the user 93 by the operation of the user 93. With this configuration, it is possible to configure an easy-to-use information display device that can display an operation screen at a location where the user who actually operates the device can easily use.

Figure 20:
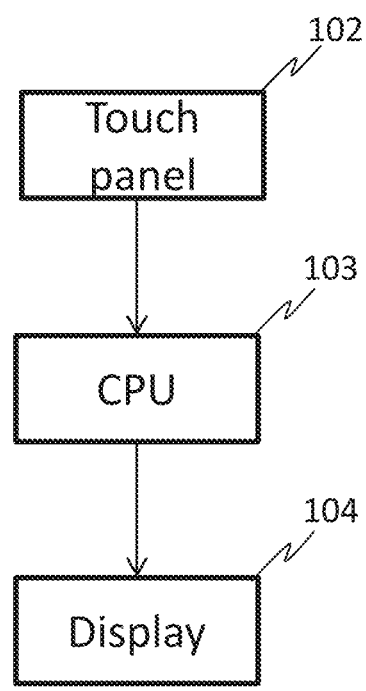
FIG. 20 shows a configuration of a system for executing a function of the information display device according to Embodiment 8.

FIG. 20 is a configuration view of the information display device in this Embodiment. As shown in FIG. 20, the wall-built-in information display device comprises a touch panel 102, a CPU 103, and a display 104.

The CPU 103 receives location information of a touch of the user 93 as detected by the touch panel 102, and the display 104 displays an operation screen at a location corresponding to the location information of the touch of the user 93.

Further, the location of the operation screen set by the user is memorized in a database (not shown) connected to the CPU 103, and the operation screen is displayed at a location convenient for the user at each startup of the device. With the above operation, in this Embodiment, the user can freely set a location of the operation screen, and therefore, it is possible to configure an information display device that is easy for the user to use.

Embodiment 9

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 21:
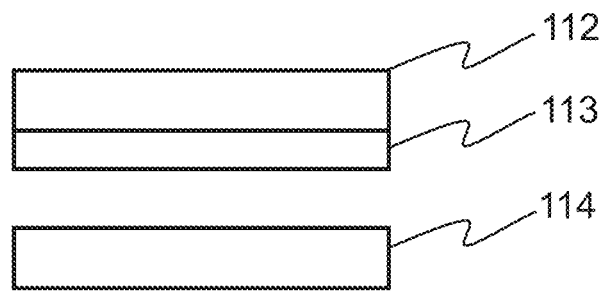
FIG. 21 shows a simplified layer structure of an information display device according to Embodiment 9.

FIG. 21 is a view showing a cross section of an information display device in this Embodiment.

The information display device in this Embodiment comprises a surface member 112, a reflective layer 113, and a display 114.

The outline of an operation of the information display device of this Embodiment will be described with reference to FIG. 21.

Figure 22:
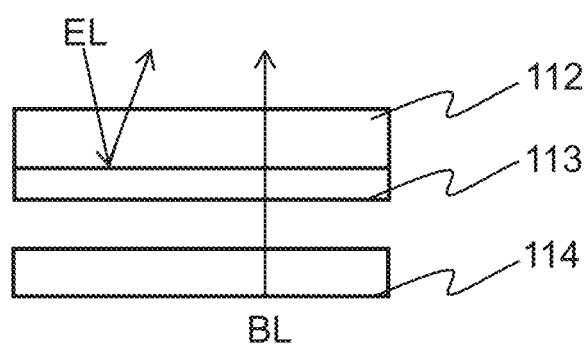
FIG. 22 is a view for explaining a display operation of the information display device according to Embodiment 9.

The basic operation of the information display device of this Embodiment is the same as that of Embodiment 4. The exception is that the reflective layer 113 is composed of a half mirror. With this configuration, the structure and colors under the surface member 112 are prevented from being seen from the outside. This makes the wall-built-in information display device look good. This situation is shown in FIG. 22.

The transmittance of the half mirror is preferably 50% to 70% in view of the balance between transmittance and reflectance.

Embodiment 10

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 23:
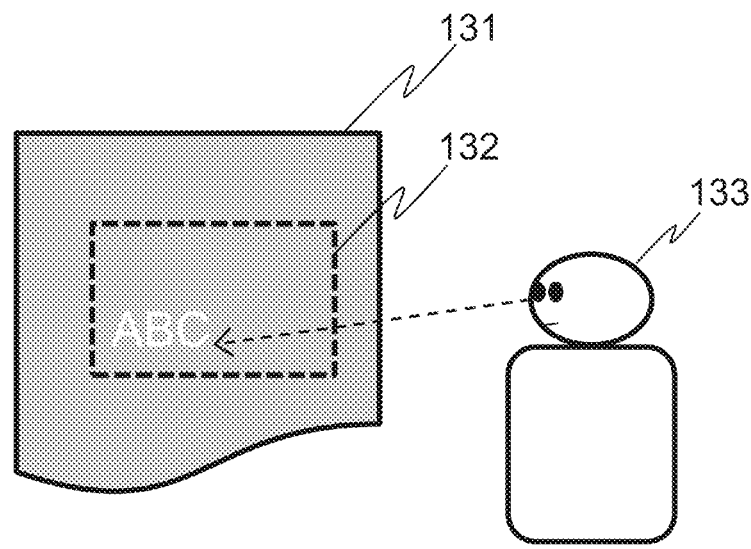
FIG. 23 is a view showing a usage environment of an information display device according to Embodiment 10.

FIG. 23 is a view showing a usage environment of the information display device in this Embodiment.

The usage environment in this Embodiment is composed of a wall surface 131, an operation screen 132, and a user 133.

Figure 24A:
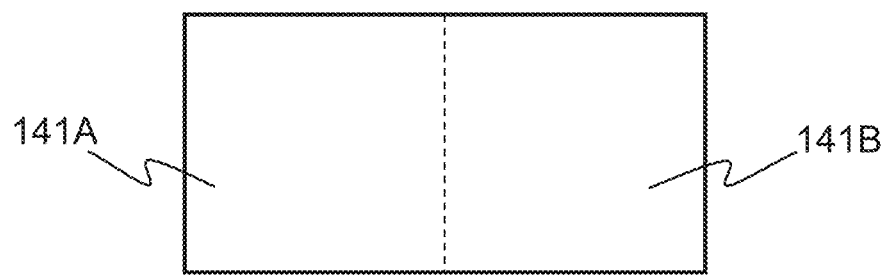
FIG. 24A is a top view of the information display device according to Embodiment 10.
Figure 24B:
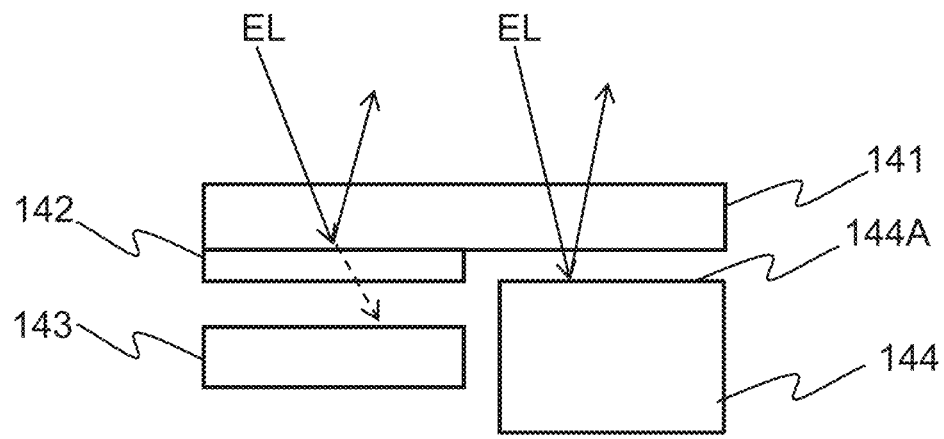
FIG. 24B is a schematic cross-sectional view of the information display device according to Embodiment 10.

FIGS. 24A and 24B respectively show a top view and a cross-sectional view of the information display device with a structure to which the information display device is attached in this Embodiment. As shown in FIG. 24B, the information display device comprises a surface member 141, a reflective layer 142, and a display 143, and attached to a structure 144 for which the wall surface 131 in FIG. 23 is also used.

The information display device in this Embodiment comprises the reflective layer 142 similar to that described in Embodiment 9. When the reflective layer has reflectance of 50% or so, the surface 141A of the surface member is affected by the surface color of the display 143, which makes the surface 141A of the surface member 141 look different from the surface 141B of the surface member 141. In particular, when the information display device is built in the wall surface 131 of FIG. 23, there is a design request that a user 133 is not aware of the presence of the display 143 when the display 143 is turned off. Therefore, in order to match the colors of the surface 141A and the surface 141B of the surface member 141, the surface 144A of the structure 144 is colored in consideration of the color of the display turned off and the reflective layer, so that the surface 141A and 141B of the surface member 141 can be matched in color. This makes it possible to hide the presence of the display 143 in design.

Specifically, when the display 143 is a liquid crystal, the color of the turned-off display is black. In this case, the surface 144A can be colored with gray considering the influence of the half mirror. This can reduce the color difference on appearance between the information display device and the wall surface 131. With this configuration, the display 143 can be hidden in terms of design, and the half mirror can be provided only on the surface of the display, so that the use of the half mirror material can be reduced.

The display in this Embodiment can be configured with another light source such as an LED, in which case the surface 144A of the structure 144 is colored in consideration of the surface color when the light is turned off.

Embodiment 11

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 25:
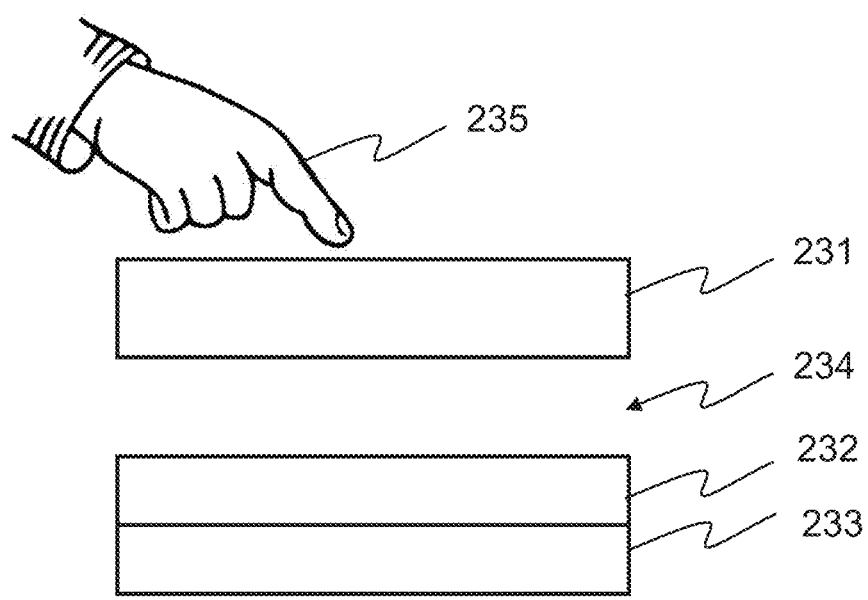
FIG. 25 shows a simplified layer structure of an information display device according to Embodiment 11.

FIG. 25 is a view showing a usage environment of the information display device in this Embodiment. The usage environment in this Embodiment is composed of a surface member 231, a touch panel 232, a display 233, a gap 234 between the surface member and the touch panel, and a user's finger 235.

In this Embodiment, when the information display device is installed, a gap 234 is created between the surface member and the other members due to the structure in consideration of maintainability. In that case, since a certain distance exists between the touch panel 232 and the user's finger 235, there is a possibility that the input may be hindered.

In view of the above, according to the information display device in this Embodiment, the touch panel 232 is capable of hover input, and even if a gap 234 is created, the information display device does not cause a user to feel uncomfortable with his/her input.

Figure 26:
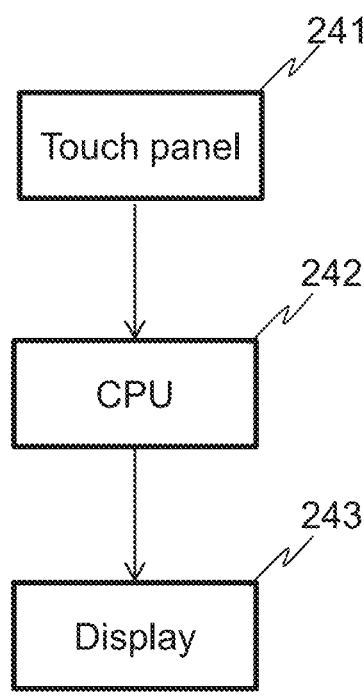
FIG. 26 shows a configuration of a system for executing a function of the information display device according to Embodiment 11.

FIG. 26 is a configuration view of the information display device in this Embodiment. As shown in FIG. 26, the information display device comprises a touch panel 241, a CPU 242, and a display 243.

The touch panel 241 capable of hover input detects an operation by the user's finger 235 through the gap 234 and the surface member 231 and transmits the detected operation to the CPU 242. The CPU 242 analyzes the hover input information and displays on the display 243 an action corresponding to the detected operation.

With the above operation, in this Embodiment, even if there is a gap between the surface member and the touch panel, it is possible to configure a wall-built-in information display device that is easy for a user to use. There may be another member disposed in the gap 234.

Embodiment 12

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 27:
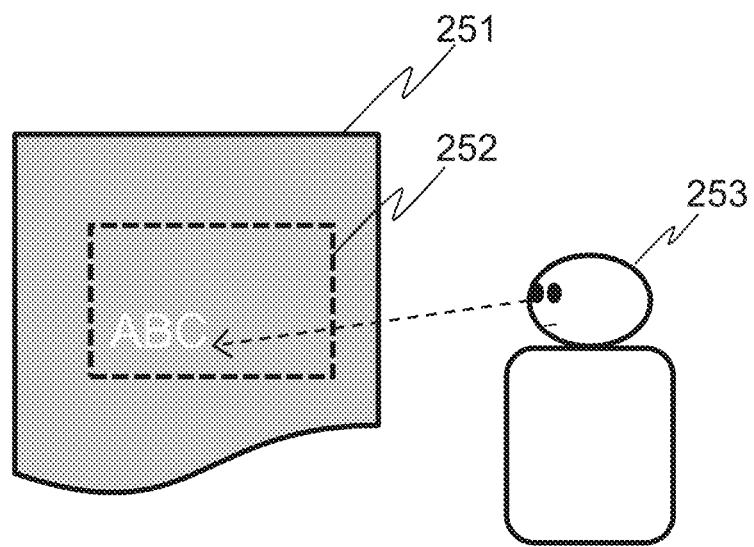
FIG. 27 is a view showing a usage environment of an information display device according to Embodiment 12.

FIG. 27 shows a usage environment of the information display device in this Embodiment.

The usage environment in this Embodiment is composed of a wall surface 251, an operation screen 252, and a user 253.

The outline of an operation of the information display device of this Embodiment will be described with reference to FIG. 27.

Figure 28A:
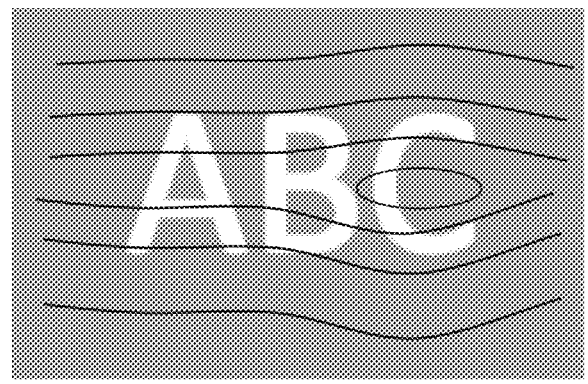
FIG. 28A shows an example of a display image of the information display device according to Embodiment 12.
Figure 28B:
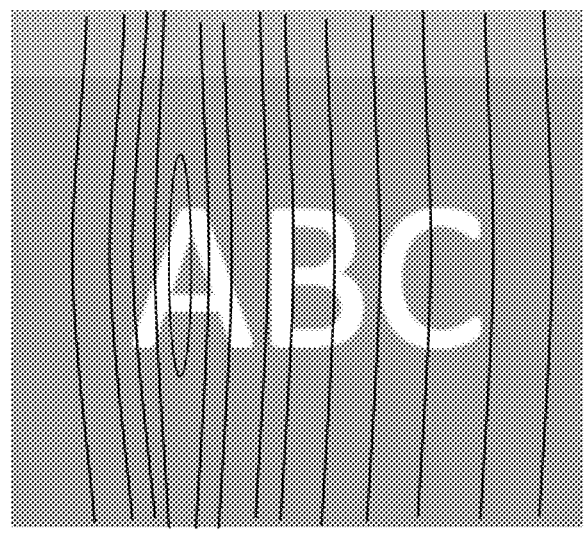
FIG. 28B shows an example of a display image of the information display device according to Embodiment 12.

The basic operation of the information display device of this Embodiment is the same as that of Embodiment 4. The exception is that a wood grain pattern is displayed on the wall surface 251 and the operation screen 252, and the information display device displays a content superimposed on the wood grain pattern. In this case, as shown in FIGS. 28A and 28B, graphics and characters are arranged so that their orientation is orthogonal to the orientation of the wood grain pattern. Accordingly, it is possible to configure an information display device that can present information that is easy for the user 253 to discriminate without being disturbed by the wood grain pattern.

Figure 28C:
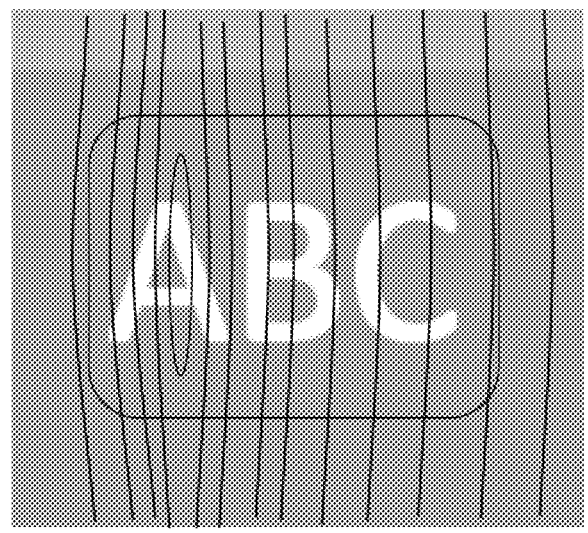
FIG. 28C shows an example of a display image of the information display device according to Embodiment 12.
Figure 28D:
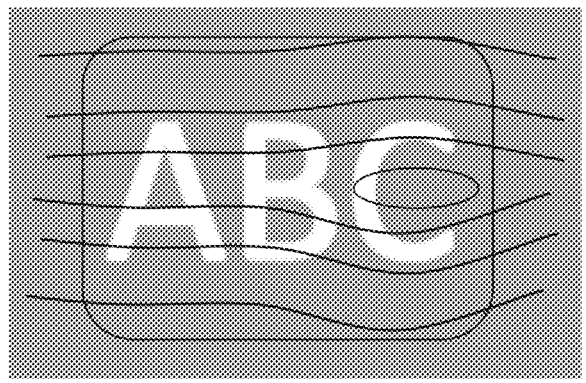
FIG. 28D shows an example of a display image of the information display device according to Embodiment 12.

On the other hand, from the viewpoint of maintainability, when a boundary line is created at an edge of the information display device, the appearance of the boundary line is desired to be minimized as much as possible in view of design. Taking advantage of the configuration, the boundary line is disposed so as to be along the wood grain pattern to a maximum extent as shown in FIGS. 28C and 28D. As a result, the appearance of the boundary line is minimized by the wood grain pattern, and therefore, it is possible to configure an information display device that is almost seamless in design.

Figure 28E:
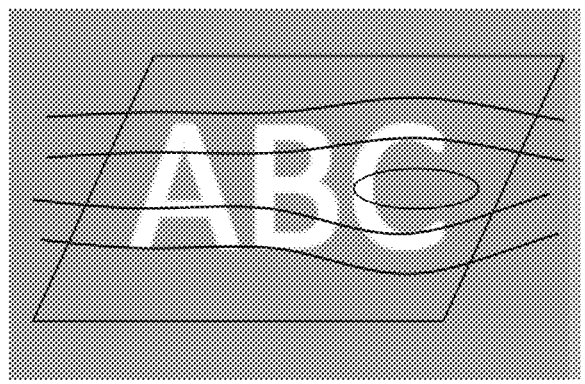
FIG. 28E shows an example of a display image of the information display device according to Embodiment 12.
Figure 28F:
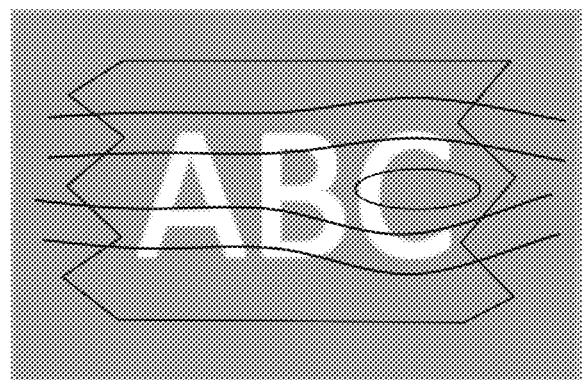
FIG. 28F shows an example of a display image of the information display device according to Embodiment 12.

Naturally, an edge appears on sides of the information display device in one direction and sides thereof orthogonal to the one direction, but as shown in FIGS. 28E and 28F, the appearance of the wood grain pattern can be minimized by diagonal lines formed along the wood grain pattern to a maximum extent.

Figure 29A:
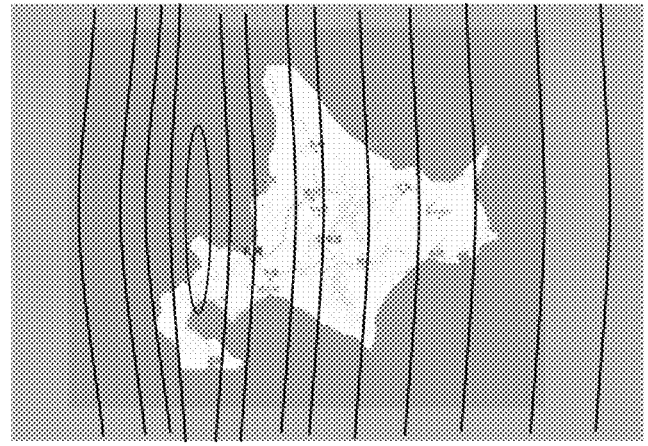
FIG. 29A shows an example of a display image of the information display device according to Embodiment 12.
Figure 29B:
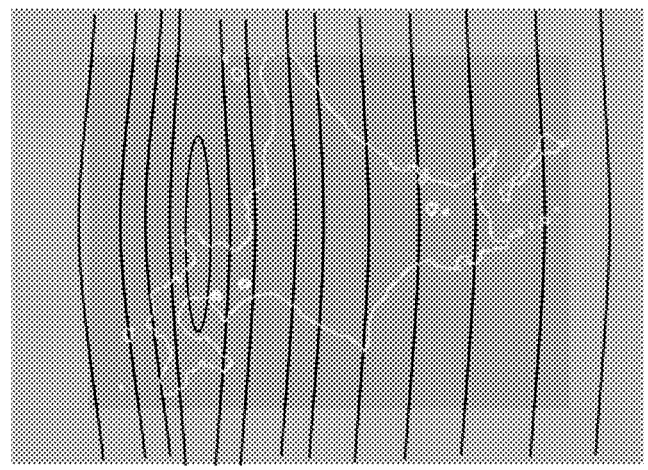
FIG. 29B shows an example of a display image of the information display device according to Embodiment 12.

As shown in FIGS. 29A and 29B, for the graphics displayed on the wood grain pattern, the contrast can be enhanced with line-work instead of solid painting. Therefore, it is possible to configure an information display device in which graphics can be discriminated without being disturbed by the wood grain pattern.

Embodiment 13

In the following description, the members having the same names as those in the above-mentioned Embodiments may be designated by different reference numerals but may have the same configurations and functions as those in the above-mentioned Embodiments. Description of the configurations and the functions that have already been described may be omitted.

FIG. 30 is a view showing a usage environment of the information display device in this Embodiment. The usage environment in this Embodiment is composed of a surface member 301, a touch panel 302, and a display 303.

FIG. 31 is a configuration view of an information display device in this Embodiment. As shown in FIG. 31, the information display device comprises a touch panel 311, a CPU 312, and a display 313.

FIG. 32 is a graph showing variation of screen brightness with time in this Embodiment. The brightness of the display 313 is sufficiently low during standby. When the touch panel 311 becomes active by detecting a touch of a user (for example, an aircraft passenger), the display 313 is temporarily changed to a high brightness state to notify the user (passenger) of the UI (User Interface) being active. This allows the UI to show its location. After that, the brightness is lowered a little so as not to unnecessarily emphasize the presence of the display, and the display is ready to provide an application that is easy for a user to operate. Further, by shortening the high brightness state, it is possible to extend the product life.

Embodiment 14

In the following description, the members having the same names as those in the above-mentioned Embodiments may be designated by different reference numerals but may have the same configurations and functions as those in the above-mentioned Embodiments. Description of the configurations and the functions that have already been described may be omitted.

Figure 33:
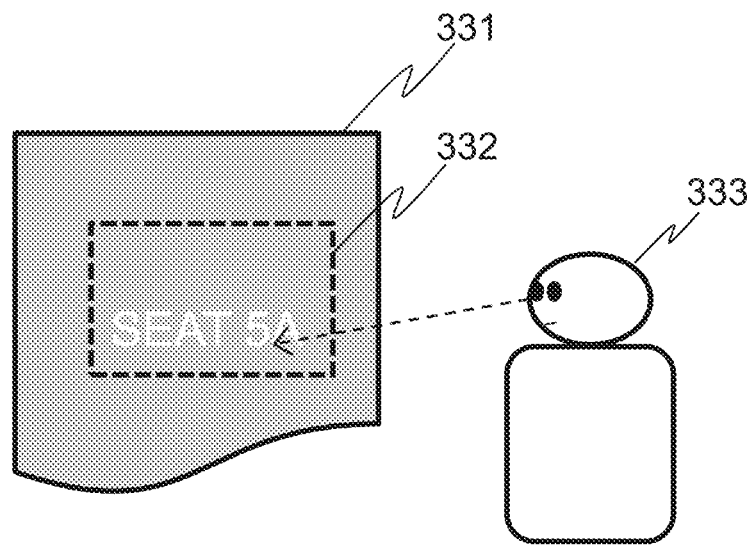
FIG. 33 is a view showing a usage environment of an information display device according to Embodiment 14.

FIG. 33 shows a usage environment of the information display device in this Embodiment. An operation screen 332 is embedded in the wall surface 331.

Figure 34:
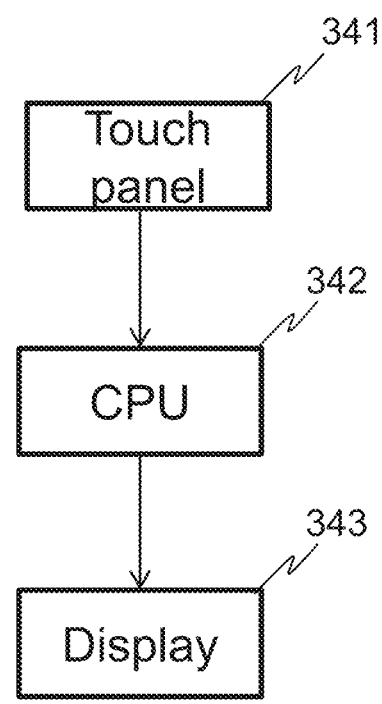
FIG. 34 shows a configuration of a system for executing a function of the information display device according to Embodiment 14.

FIG. 34 is a configuration view of the information display device in this Embodiment. As shown in FIG. 34, the information display device comprises a touch panel 341, a CPU 342, and a display 343.

When the operation screen 332 (display 343) is inactive, a user 333 is not aware of the location of the operation screen 332. In this case, for example, when the information display device of this Embodiment is installed in an aircraft or the like, a seat number can be displayed on the operation screen 332 when the user 333 is boarding. With this configuration, the user can be aware of the location of the operation screen 332 in a natural way while being given useful information. The information to be displayed at this time may be other than a seat number, and may be any type of logo, mark, operation icon or the like.

Embodiment 15

In the following description, the members having the same names as those in the above-mentioned Embodiments may be designated by different reference numerals but may have the same configurations and functions as those in the above-mentioned Embodiments. Description of the configurations and the functions that have already been described may be omitted.

FIG. 35 shows a usage environment of the information display device in this Embodiment.

The usage environment in this Embodiment is composed of a wall surface 351, an operation screen 352, and a user 353.

The outline of an operation of the information display device of this Embodiment will be described with reference to FIG. 35.

The basic operation of the information display device of this Embodiment is the same as that of Embodiment 4. The exception is that locations of icons and controller buttons are shifted by inches so that the user 353's operation does not concentrate in the same location every time. As a result, the location of the user 353's operation is prevented from concentrating in one place. This can configure an information display device that can disperse and minimize damage to the wall surface 351, which is caused by pushing or rubbing the same portion of the wall surface 351 repeatedly.

FIG. 36 is a cross-sectional view of the information display device in this Embodiment, and FIG. 37 is a system configuration view of the information display device in this Embodiment. The information display device in this Embodiment comprises a surface member 362, a touch panel 363 (371), a display 364 (373), and a CPU 372. The device is operated by a user's finger 361.

Normally, when an icon or an operation button is displayed in one place, the user's finger 361 pushes or rubs the same portion on the wall surface 351 repeatedly. In particular, in a case where the device is a terminal used by an unspecified number of people such as in an aircraft, the wear and tear becomes prominent with long-term use.

Therefore, in this Embodiment, the CPU 372 performs control so that the location for displaying the icon is shifted from one to another at regular intervals so as not to display the icon in the same portion repeatedly.

If the location is shifted by a distance of about 10 mm to 15 mm, which is based on an average thickness of a finger, load can be dispersed to prevent the same portion in wall surface from being rubbed. A similar effect can be obtained even if the location is shifted by a distance of 10 mm or less, which enables gradual dispersion.

Embodiment 16

In the following description, the members having the same names as those in the above-mentioned Embodiments may be designated by different reference numerals but may have the same configurations and functions as those in the above-mentioned Embodiments. Description of the configurations and the functions that have already been described may be omitted.

FIG. 38 shows a usage environment of the information display device in this Embodiment.

The usage environment in this Embodiment is composed of a wall surface 381, an operation screen 382, and a user 383.

FIG. 39 is a cross-sectional view of the information display device in this Embodiment, and FIG. 40 is a system configuration view of the information display device in this Embodiment. The information display device in this Embodiment comprises a surface member 391, a display 392 (402), and a CPU 401.

The information display device in this Embodiment is characterized in that the display 392 is hidden behind the surface member 391. However, when a liquid crystal display is used for the display 392, a small amount of light from a backlight generally comes out from the non-display portion (black portion), and when the transparency of the surface member 391 is high, the light leaks out. This causes the presence of the liquid crystal display to be noticeable to the user through the surface member 391.

In this Embodiment, the transmittance of the surface member 391 is low. This can configure an information display device that prevents unnecessary light emitted from the display 392 from reaching eyes of the user 383, so that the presence of the device is unnoticeable to the user.

The transmittance of the surface member 391 is preferably 20% or so.

Embodiment 17

This Embodiment solves the same problem as Embodiment 16 by providing a self-luminous device such as a matrix LED or an organic EL for the display 392 (402) under the same usage environment as in FIG. 38 and in the same system configuration as in FIGS. 39 and 40. By using it, it is possible to eliminate unnecessary light in the non-display portion of the display. As a result, it is possible to prevent the presence of the display 392 from being noticeable to the user 383 in an unnatural manner.

Other Embodiments

The above-mentioned embodiment was described as an illustration of technology described in this application. However, the technique in the present disclosure is not limited to this, and can be applied to embodiments in which changes, replacements, additions, omissions, etc. are made as appropriate. It is also possible to combine the components described in the above embodiments to form a new embodiment.

REFERENCE NUMERALS

1: Information display device, 2: Information display device, 3: Information display device, 11: Wall surface, 12: Operation screen, 13: User, 21: Touch panel, 22: CPU, 23: Display, 31: Surface member, 32: Touch panel, 33: Display, 51: Camera, 52: Wall surface, 53: Display, 54: User, 61: Camera, 62: Touch panel, 63: CPU, 64: Display, 71: Wall surface, 72: Display, 73: User, 81: Hand location sensor, 82: Touch panel, 83: CPU, 84: Display, 91: Wall surface, 92: Operation screen, 93: User, 102: Touch panel, 103: CPU, 104: Display, 112: Surface member, 113: Reflective layer, 114: Display, 131: Wall surface, 132: Operation screen, 133: User, 141: Surface member, 141A: Surface, 141B: Surface, 142: Reflective layer, 143: Display, 144: Structure, 144A: Surface, 151: Surface member, 152: View filter, 153: Display, 154: Gap, 171: Surface member, 172: Display, 172a: Display image, 172b: Surface image, 175: Light device, 201: Ambient light sensor, 202: CPU, 203: Memory, 204: Memory, 211: Surface member, 212: Reflective layer, 213: Touch panel, 214: View filter, 215: Display, 231: Surface member, 232: Touch panel, 233: Display, 234: Gap, 235: Finger, 241: Touch panel, 242: CPU, 243: Display, 251: Wall surface, 252: Operation screen, 253: User, 301: Surface member, 302: Touch panel, 303: Display, 311: Touch panel, 312: CPU, 313: Display, 331: Wall surface, 332: Operation screen, 333: User, 341: Touch panel, 342: CPU, 343: Display, 351: Wall surface, 352: Operation screen, 353: User, 361: Finger, 362: Surface member, 363: Touch panel, 364: Display, 372: CPU, 381: Wall surface, 382: Operation screen, 383: User, 391: Surface member, 392: Display, 401: CPU, BL: Display light, EL: Ambient light.

PRIOR ART DOCUMENT

Patent Document

Patent Document 1: Japanese Patent Application Laid-Open No. 2012-118513

The invention claimed is:
1. An information display device comprising:
a surface member configured to be at least partially transmissive for light;
a display disposed on a back side of the surface member and capable of displaying a display image, the display image including an information area for displaying information and a non-information area for displaying no information;
a light measurement unit configured to measure an amount of ambient light around the information display device; and
a controller configured to acquire the amount of ambient light measured by the light measurement unit, the controller configured to change a pixel value of the display image according to the amount of ambient light so that the display is difficult to be seen through a surface of the surface member, wherein
the pixel value includes a value representing a color,
the controller is configured to change a color of the non-information area to match a color of the surface member, and the information display device further comprises a viewing angle control filter disposed between the surface member and the display, the viewing angle control filter having a property of limiting transmission of light in all directions other than a normal direction of the display.

2. The information display device according to claim 1, wherein
the controller is configured to change the color of the non-information area to match the color of the surface member each time the display image is changed.

3. The information display device according to claim 1, wherein
the pixel value includes a value representing brightness, and
the controller is configured to
adjust brightness of the display image so that a minimum value of the brightness of the display image is equal to or higher than a threshold value, and
set the threshold value to be smaller as the amount of ambient light measured by the light measurement unit is smaller.

4. The information display device according to claim 1, comprising a memory configured to store a pixel value representing a color or brightness of the surface member,
wherein the controller is configured to change a pixel value of the non-information area according to the pixel value stored in the memory.

5. The information display device according to claim 1, comprising no reflective layer for reflecting the ambient light at least on a front side of the surface member and between the surface member and the display.

6. The information display device according to claim 1, wherein the viewing angle control filter is disposed closer to the display than the surface member.

7. An information display device comprising:
a surface member configured to be at least partially transmissive for light;
a display disposed on a back side of the surface member and capable of displaying a display image, the display image including an information area for displaying information and a non-information area for displaying no information;
a light measurement unit configured to measure an amount of ambient light around the information display device; and
a controller configured to acquire the amount of ambient light measured by the light measurement unit, the controller configured to change a pixel value of the display image according to the amount of ambient light so that the display is difficult to be seen through a surface of the surface member, wherein
the pixel value includes a value representing a color,
the controller is configured to change a color of the non-information area to match a color of the surface member,
the information display device further comprises:
an ambient light reflection filter disposed between the surface member and the display;
a viewing angle control filter disposed between the ambient light reflection filter and the display, the viewing angle control filter having a property of limiting transmission of light in all directions other than a normal direction of the display; and
a touch panel disposed between the ambient light reflection filter and the viewing angle control filter, and
wherein the ambient light reflection filter has such transmittance that light from the display is projected to the surface member when the display is emitting light, and the ambient light reflection filter has such reflectance that a color of a surface of the display does not appear on the surface of the surface member when the display is not emitting light.

8. An information display method using a device comprising a surface member that is at least partially transmissive for light, a display disposed on a back side of the surface member and capable of displaying a display image including an information area for displaying information and a non-information area for displaying no information, a light measurement unit configured to measure an amount of ambient light around the information display device, a controller configured to control the display, and a viewing angle control filter disposed between the surface member and the display, the viewing angle control filter having a property of limiting transmission of light in all directions other than a normal direction of the display,
the information display method including:
changing a color of the non-information area to match the color of the surface member;
acquiring the amount of ambient light measured by the light measurement unit; and
changing brightness of the display image according to the amount of ambient light to so that the display is difficult to be seen through a surface of the surface member.

* * * * *